Feb. 28, 1956     E. J. BERGER ET AL     2,736,105
TEXTILE TREATING APPARATUS
Filed Oct. 30, 1951     26 Sheets-Sheet 1
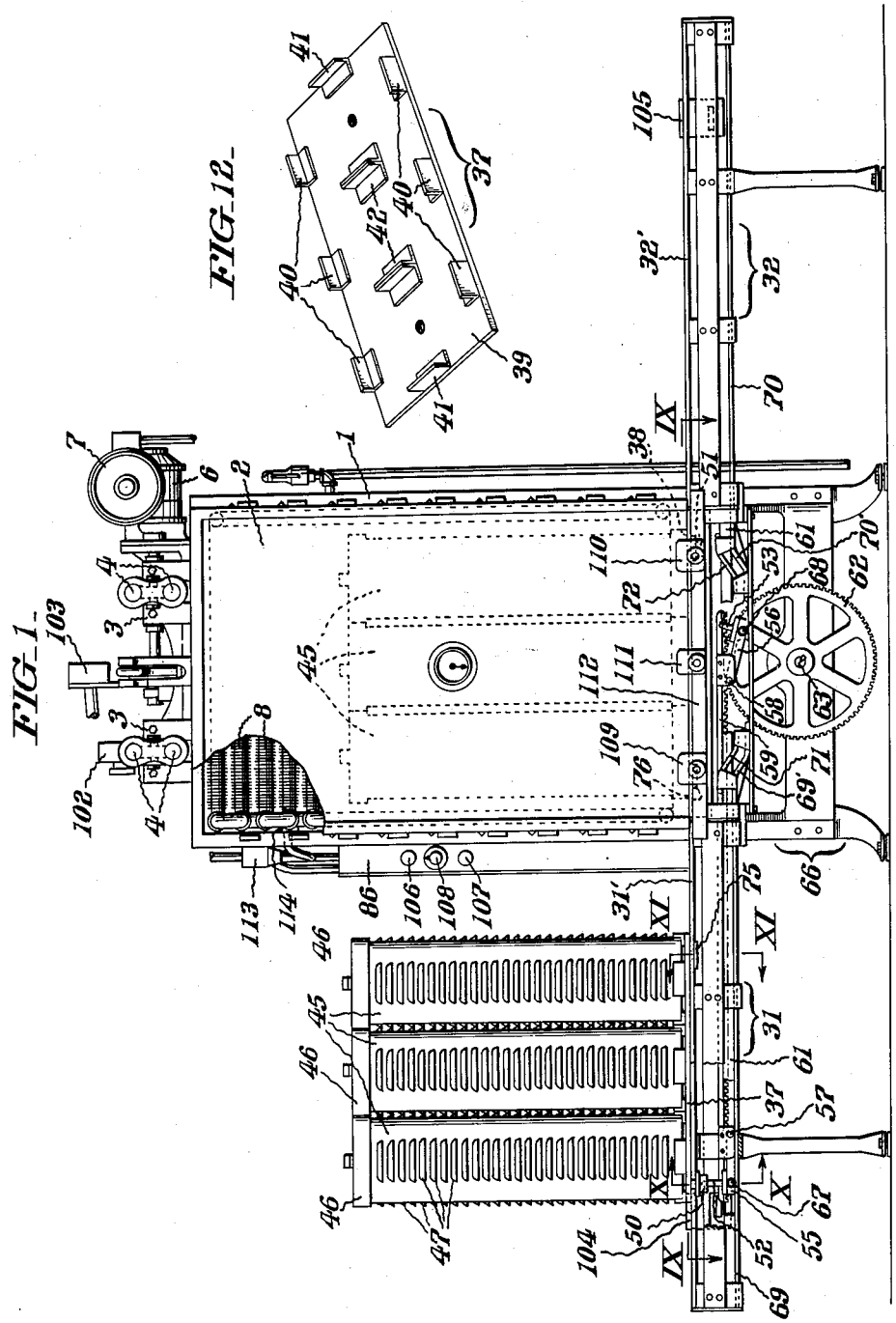
INVENTORS:
Emil J. Berger &
Howard W. Matthews,
BY Paul & Paul
ATTORNEYS.

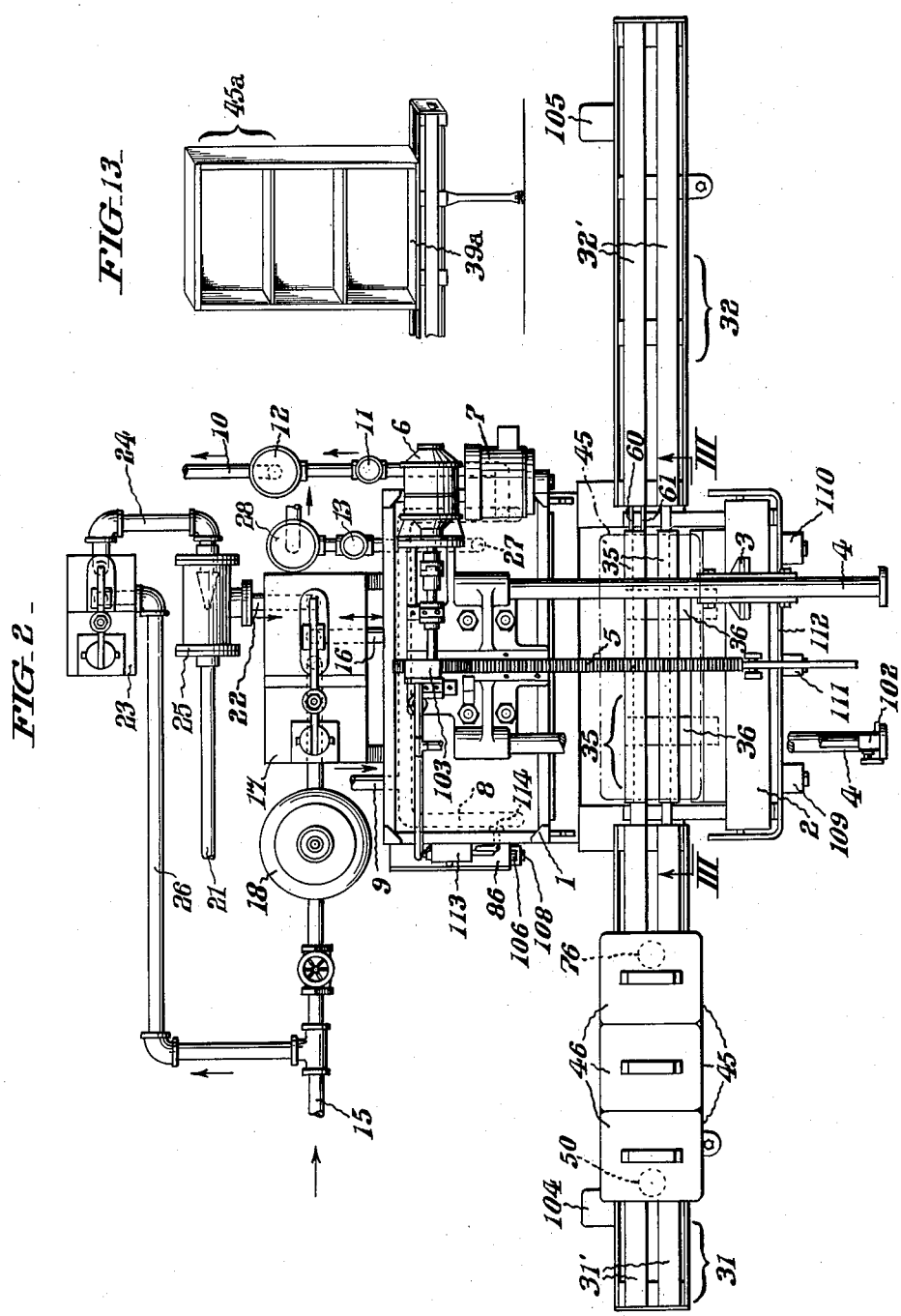

Feb. 28, 1956 E. J. BERGER ET AL 2,736,105
TEXTILE TREATING APPARATUS
Filed Oct. 30, 1951 26 Sheets-Sheet 3
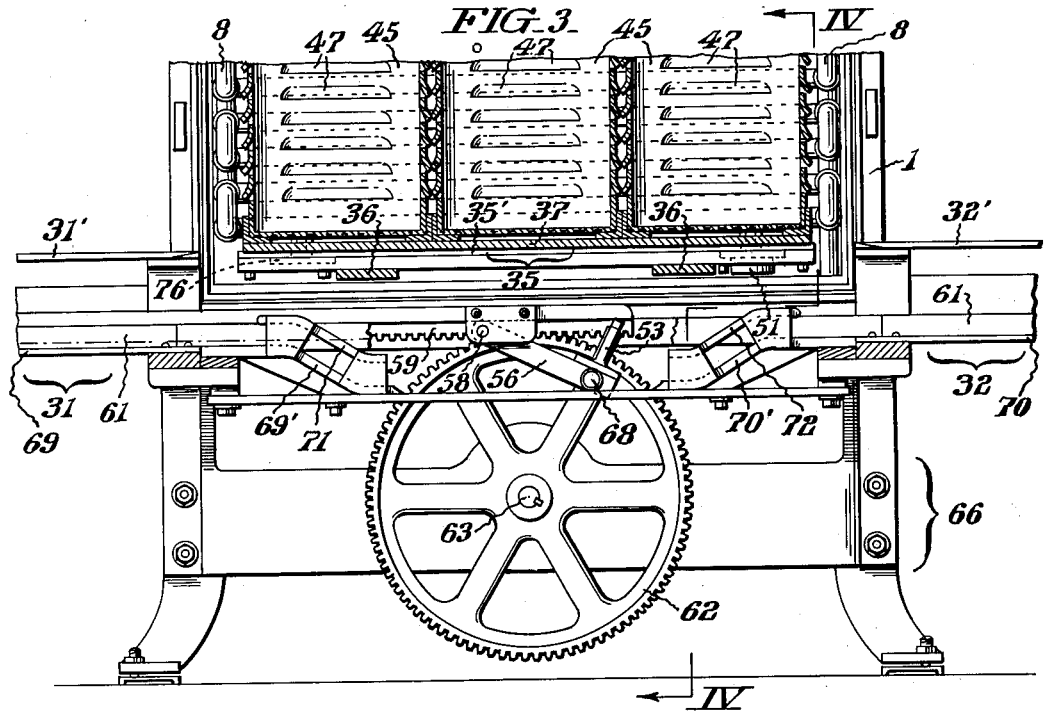
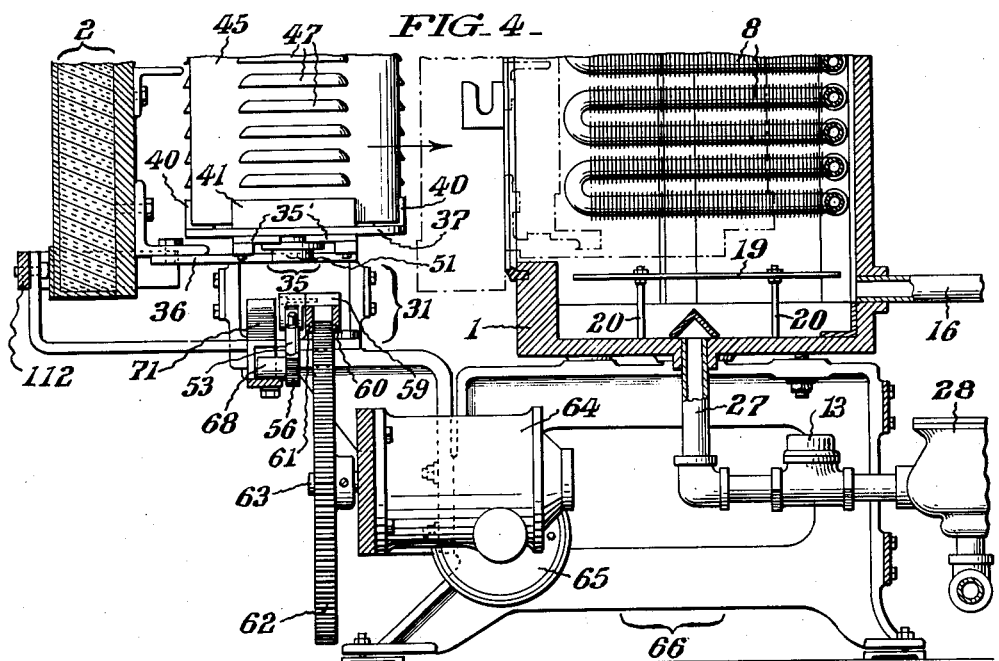
INVENTORS:
Emil J. Berger &
Howard W. Matthews,
BY Paul & Paul
ATTORNEYS.

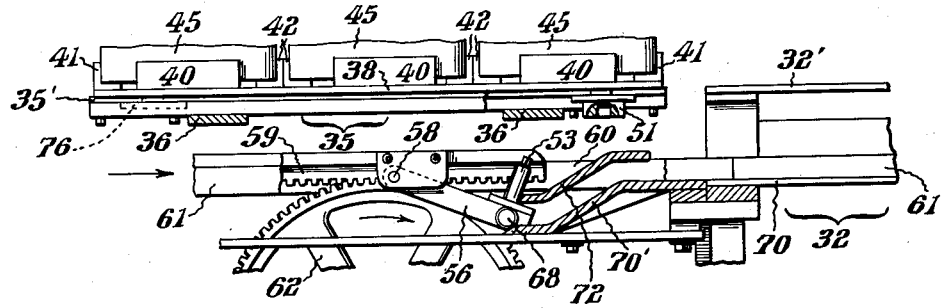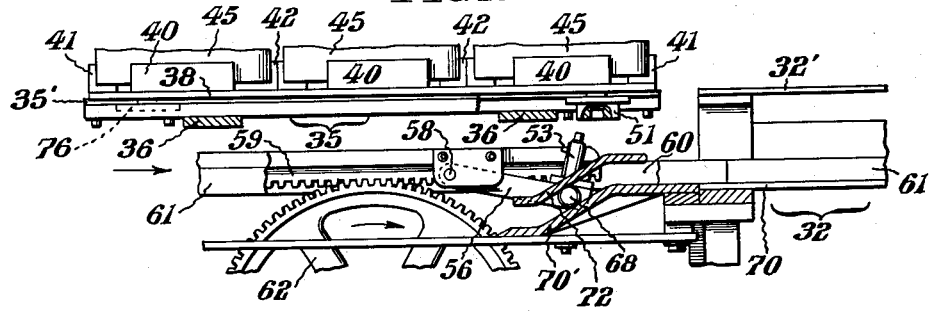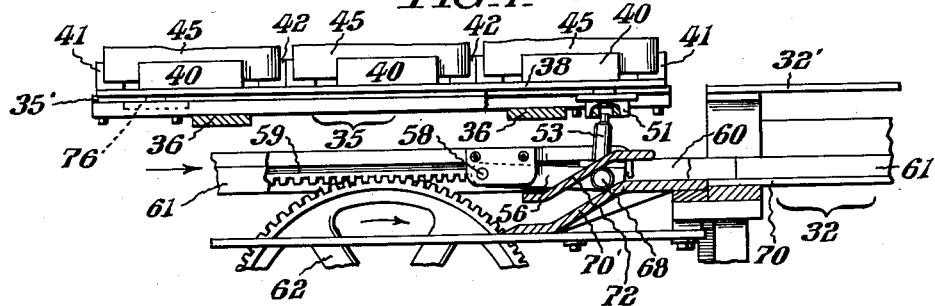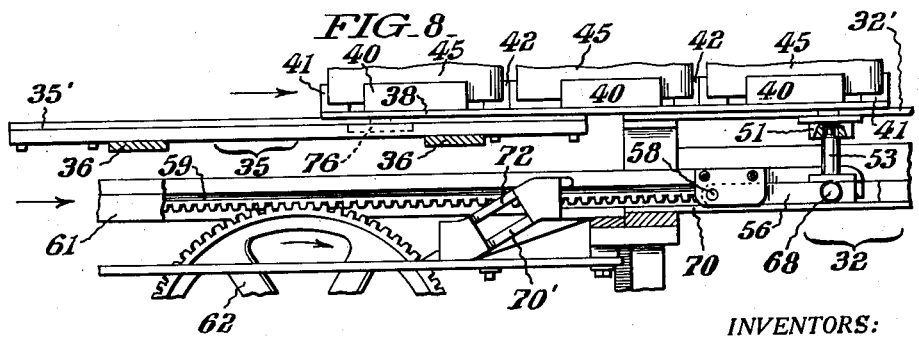

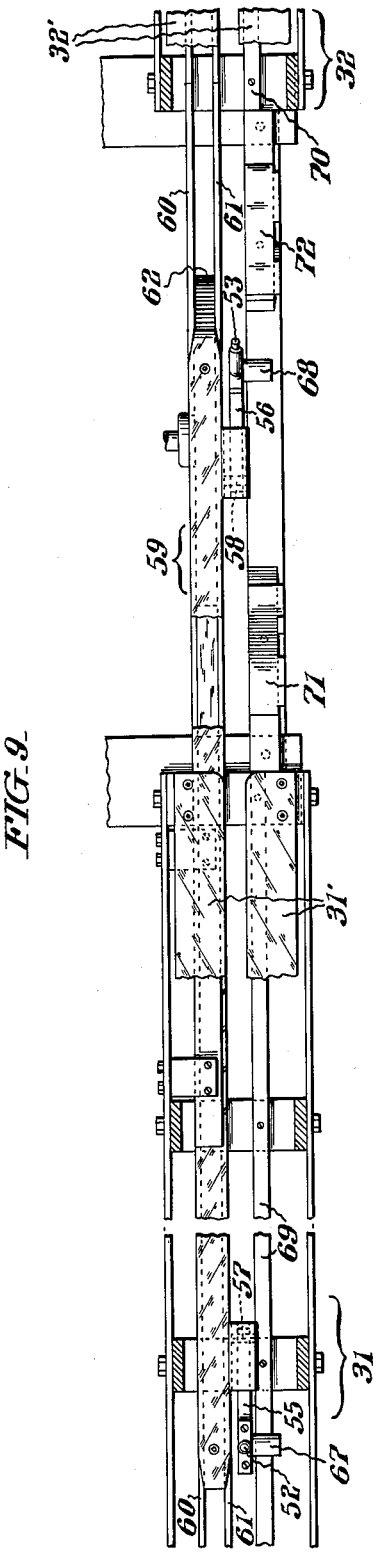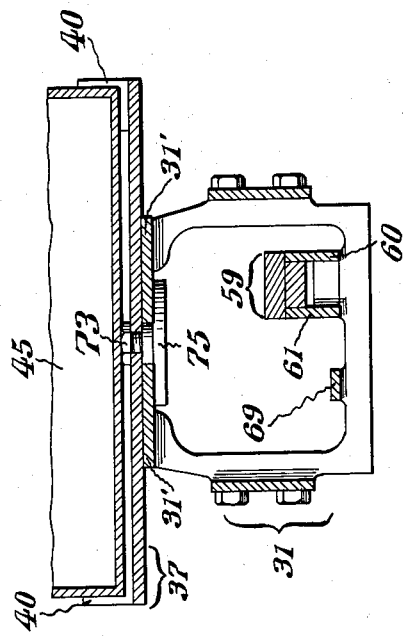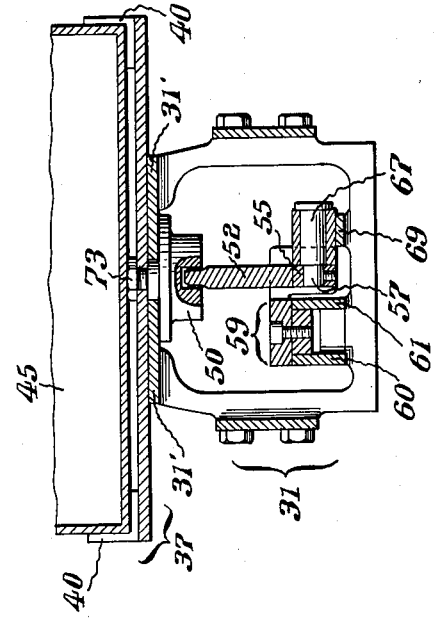

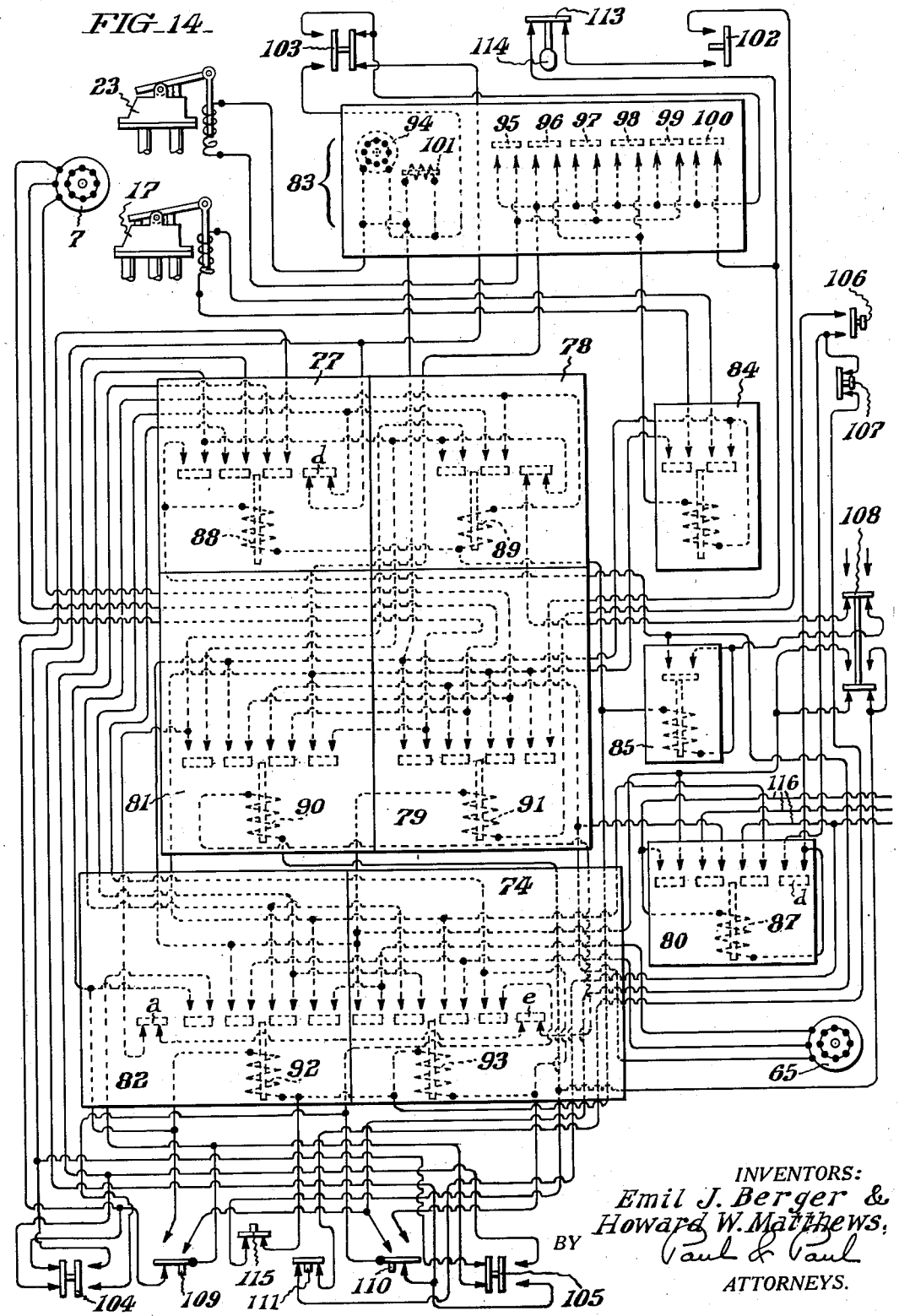

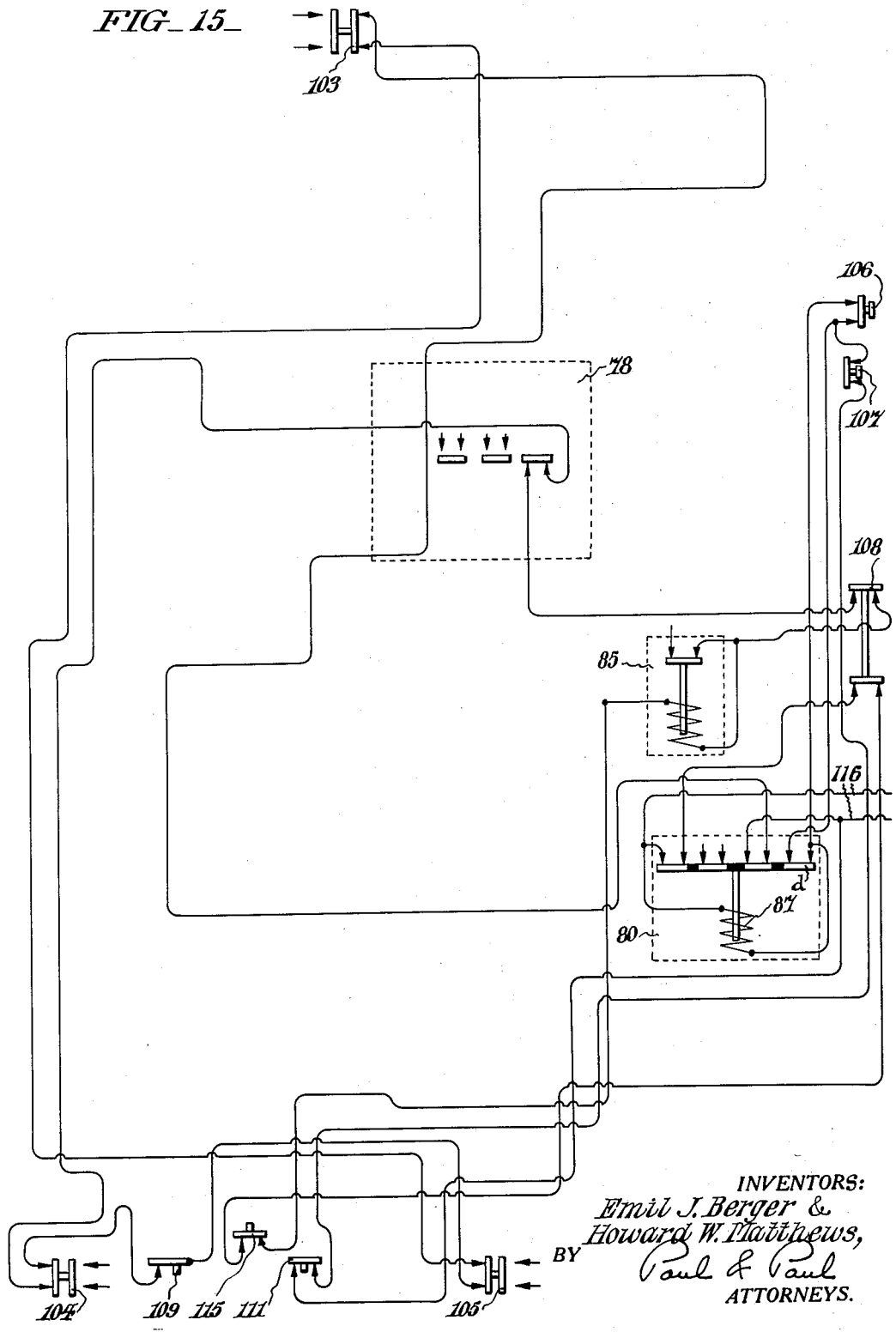

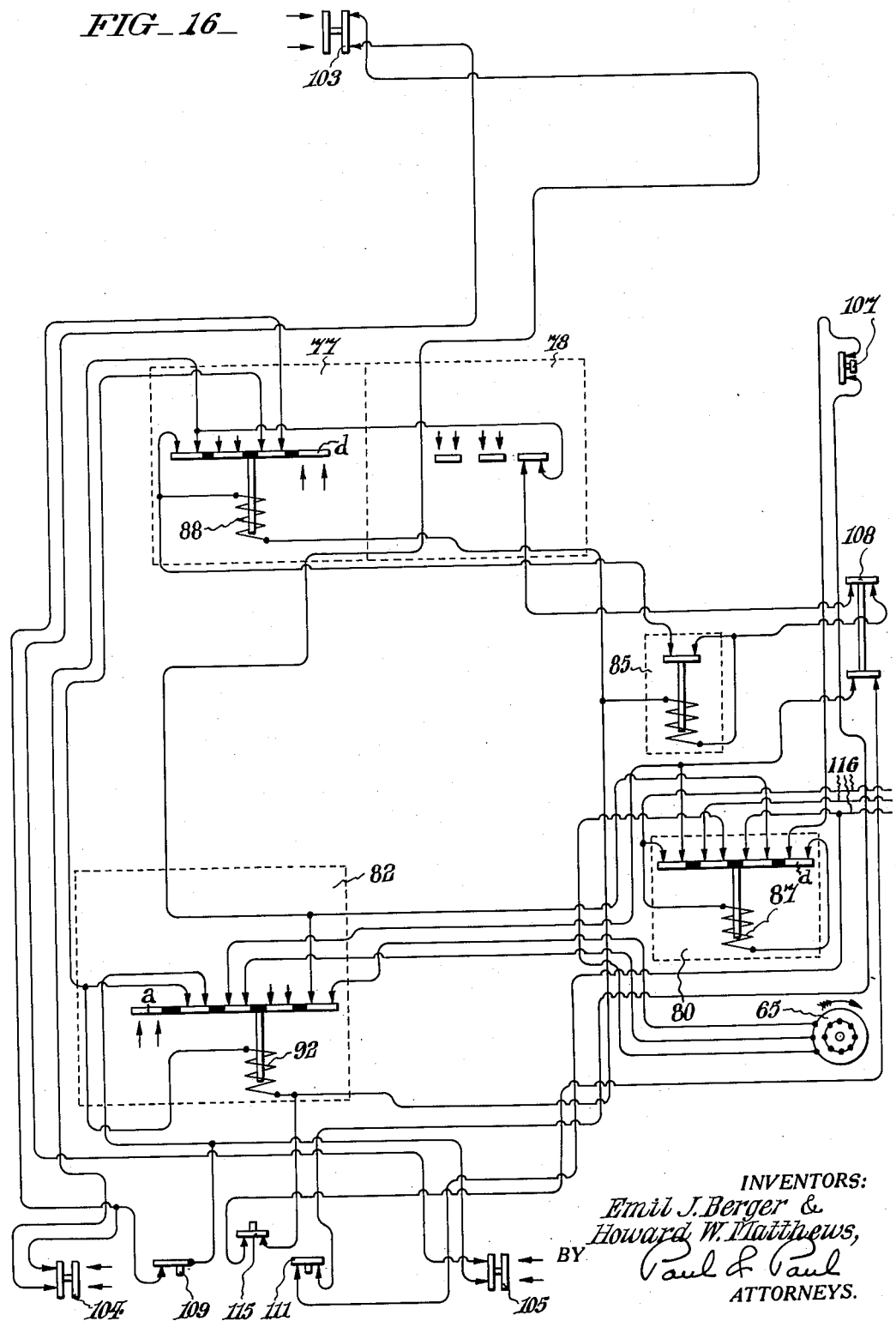

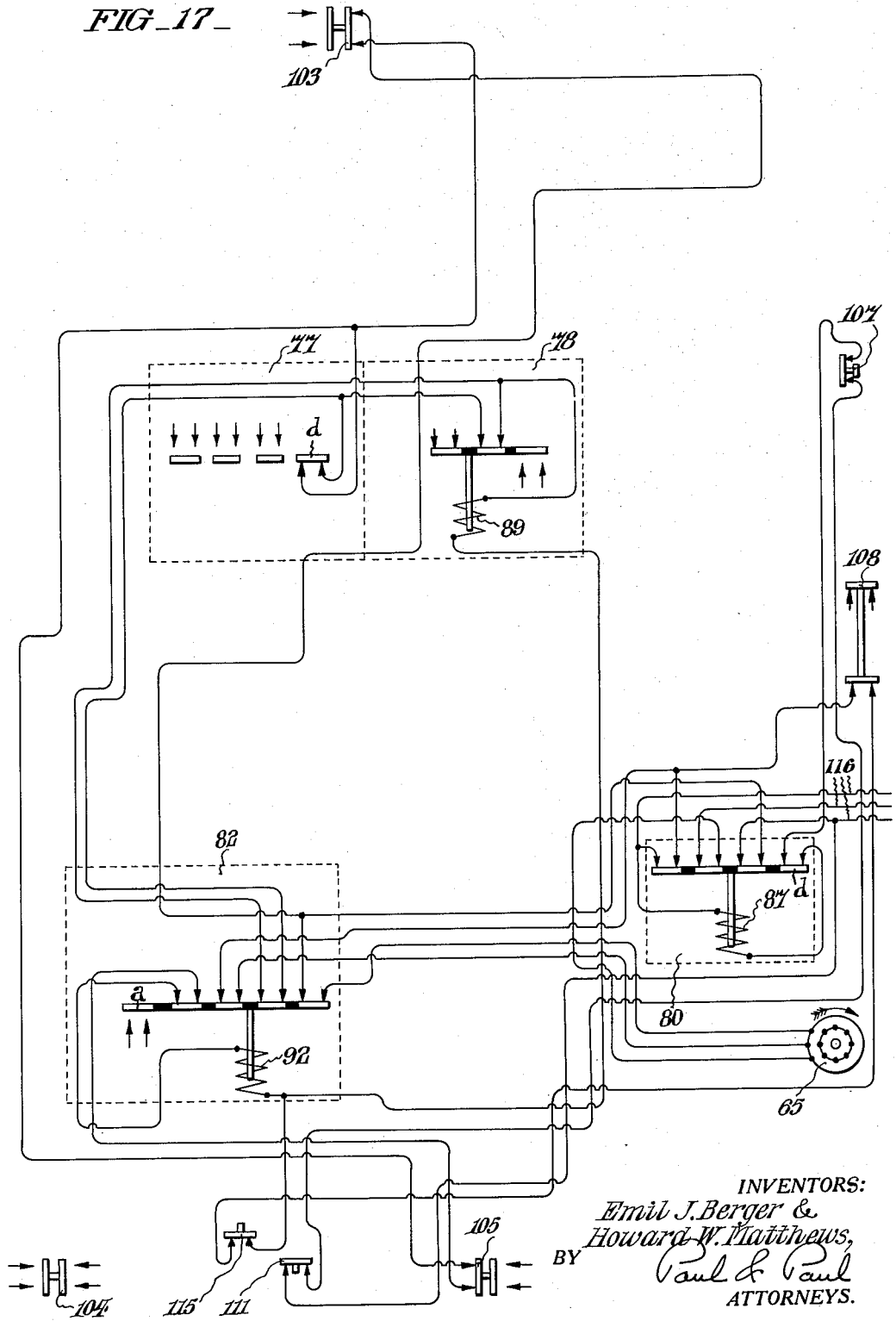

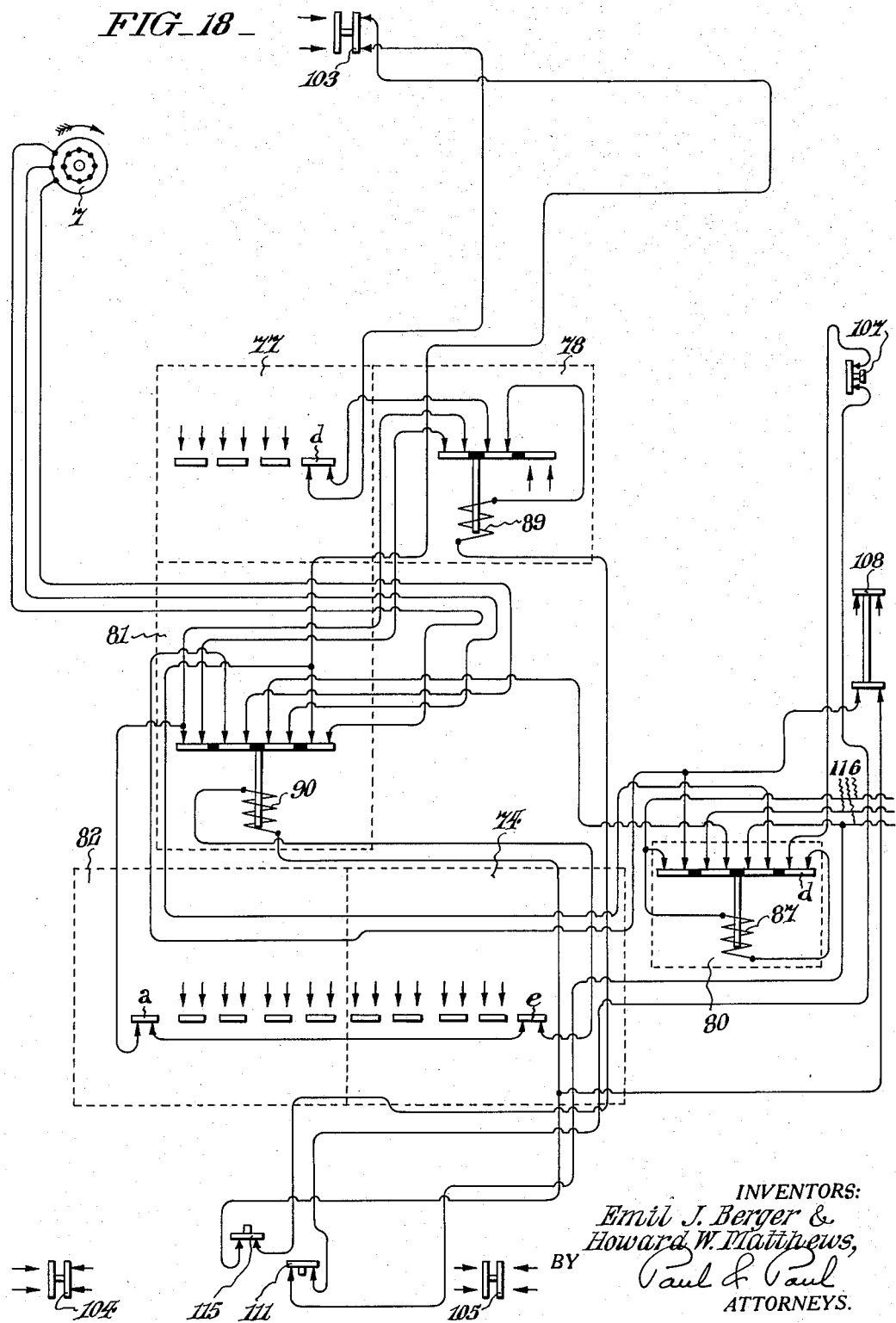

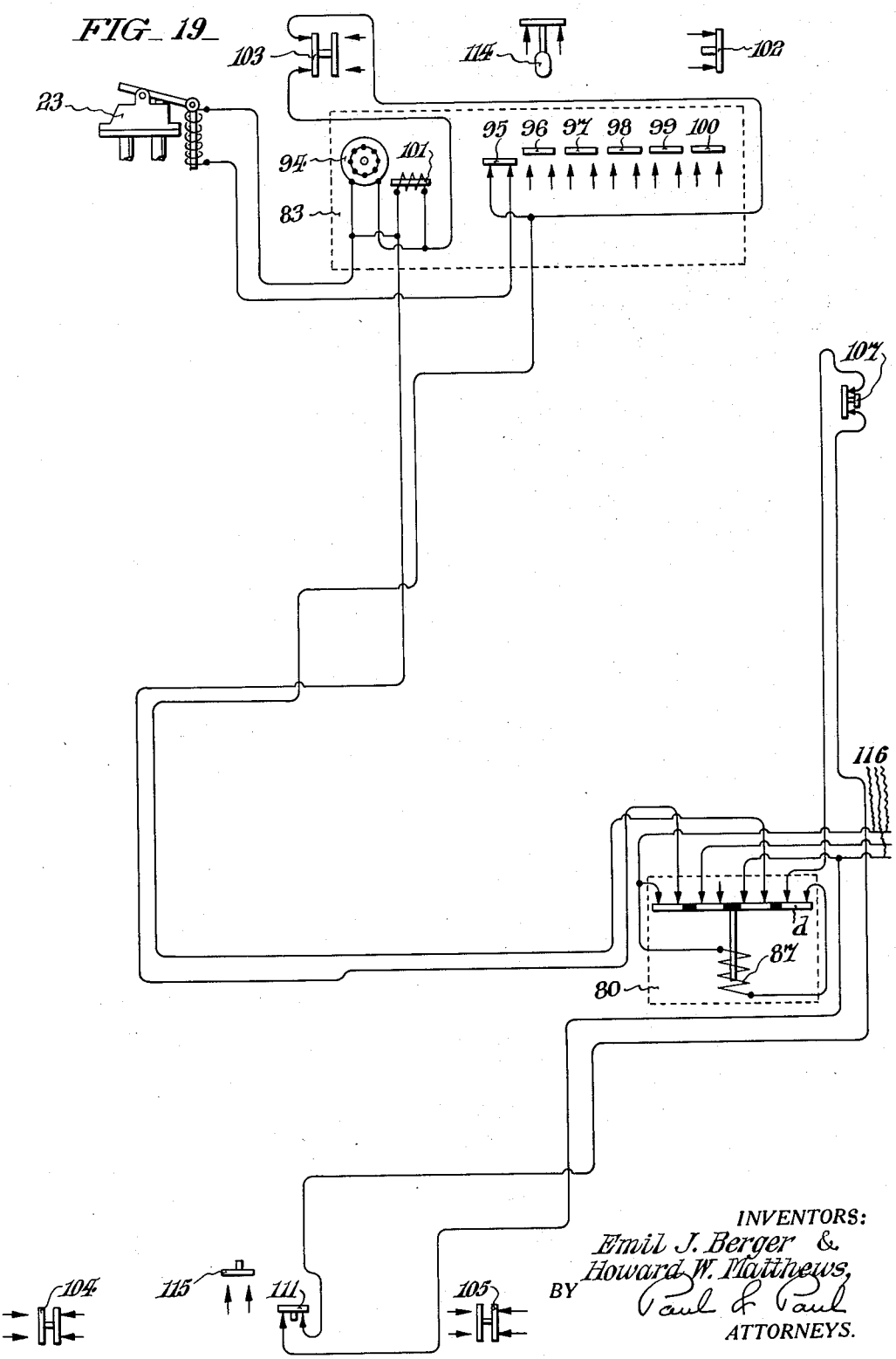

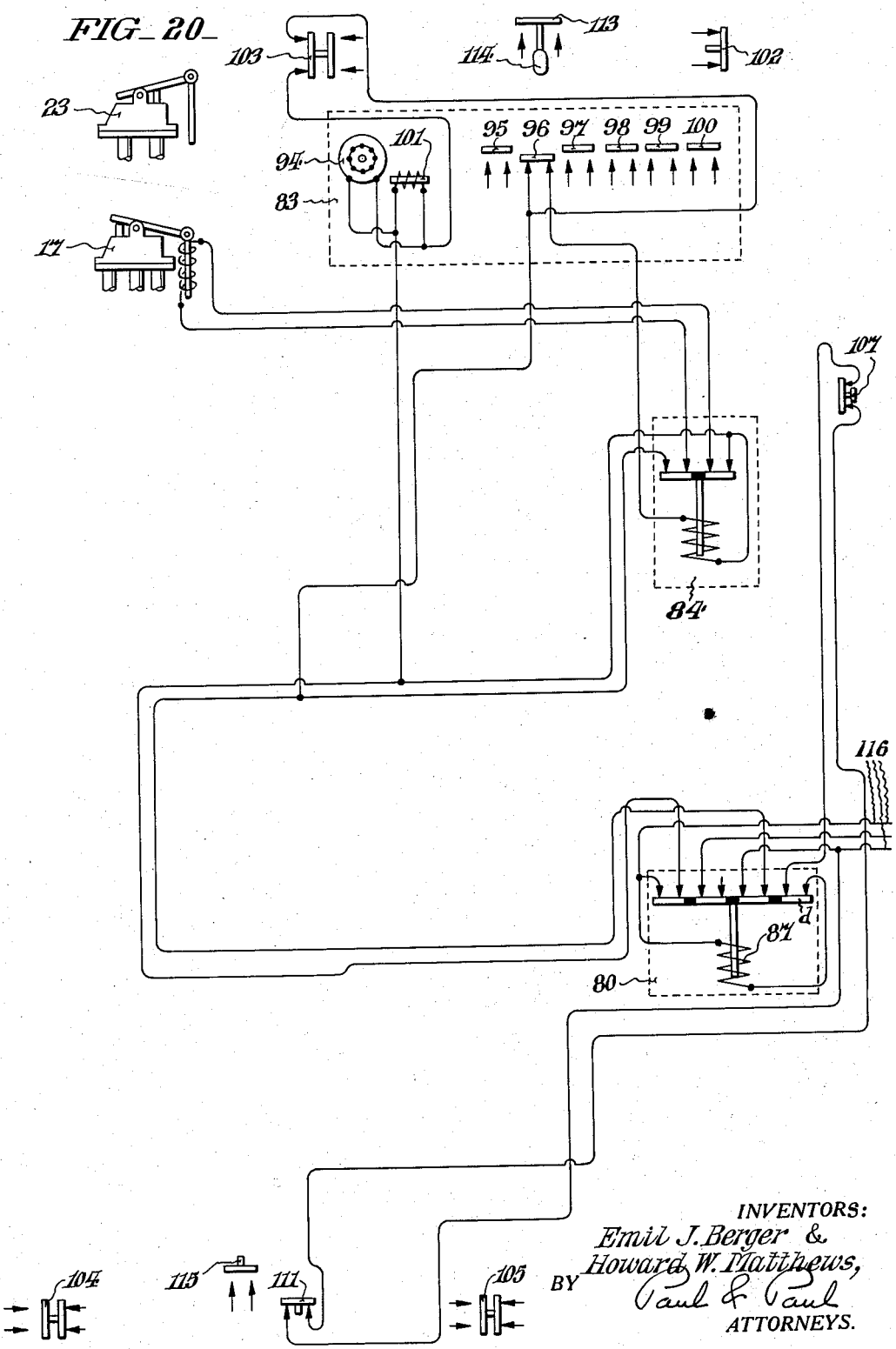

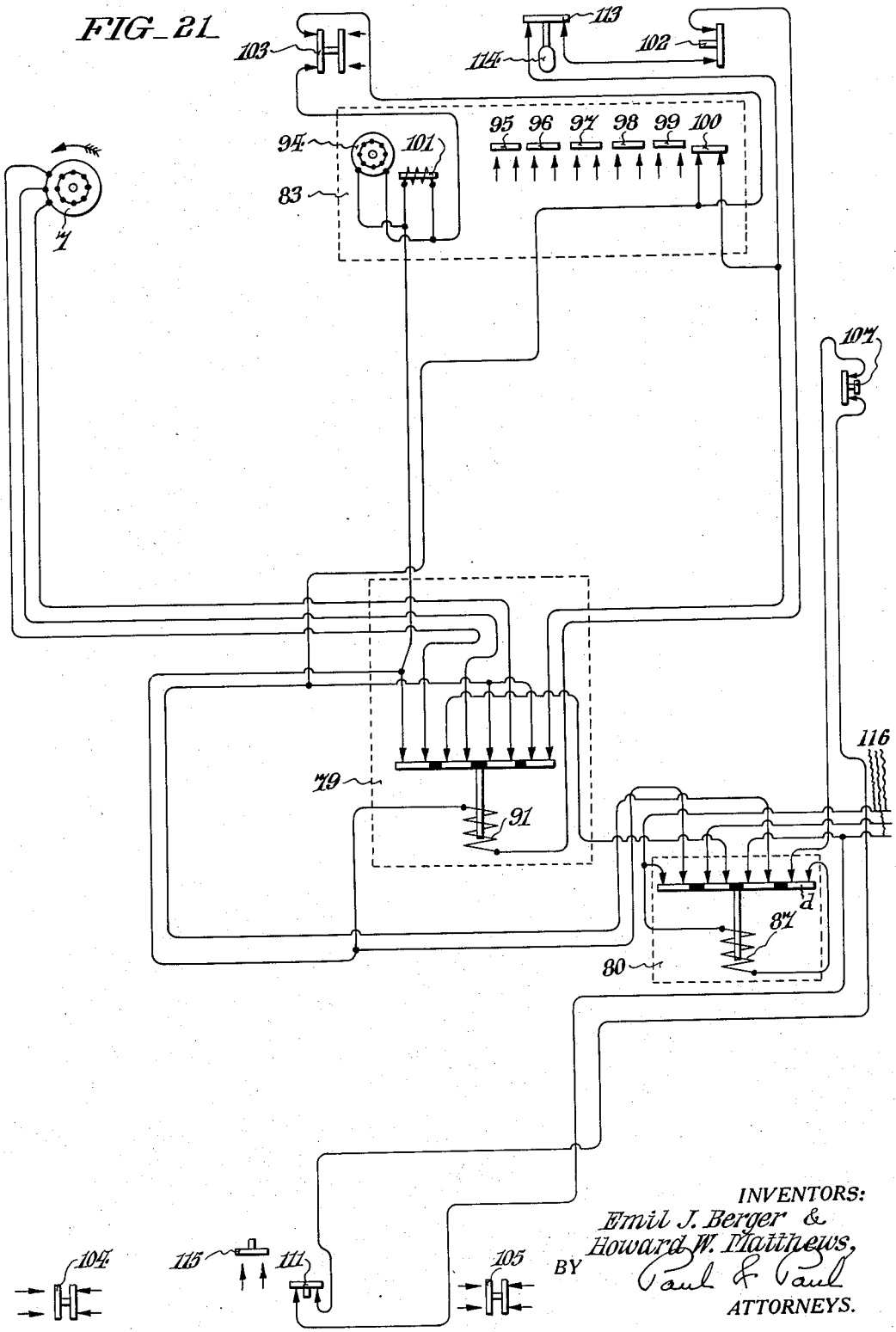

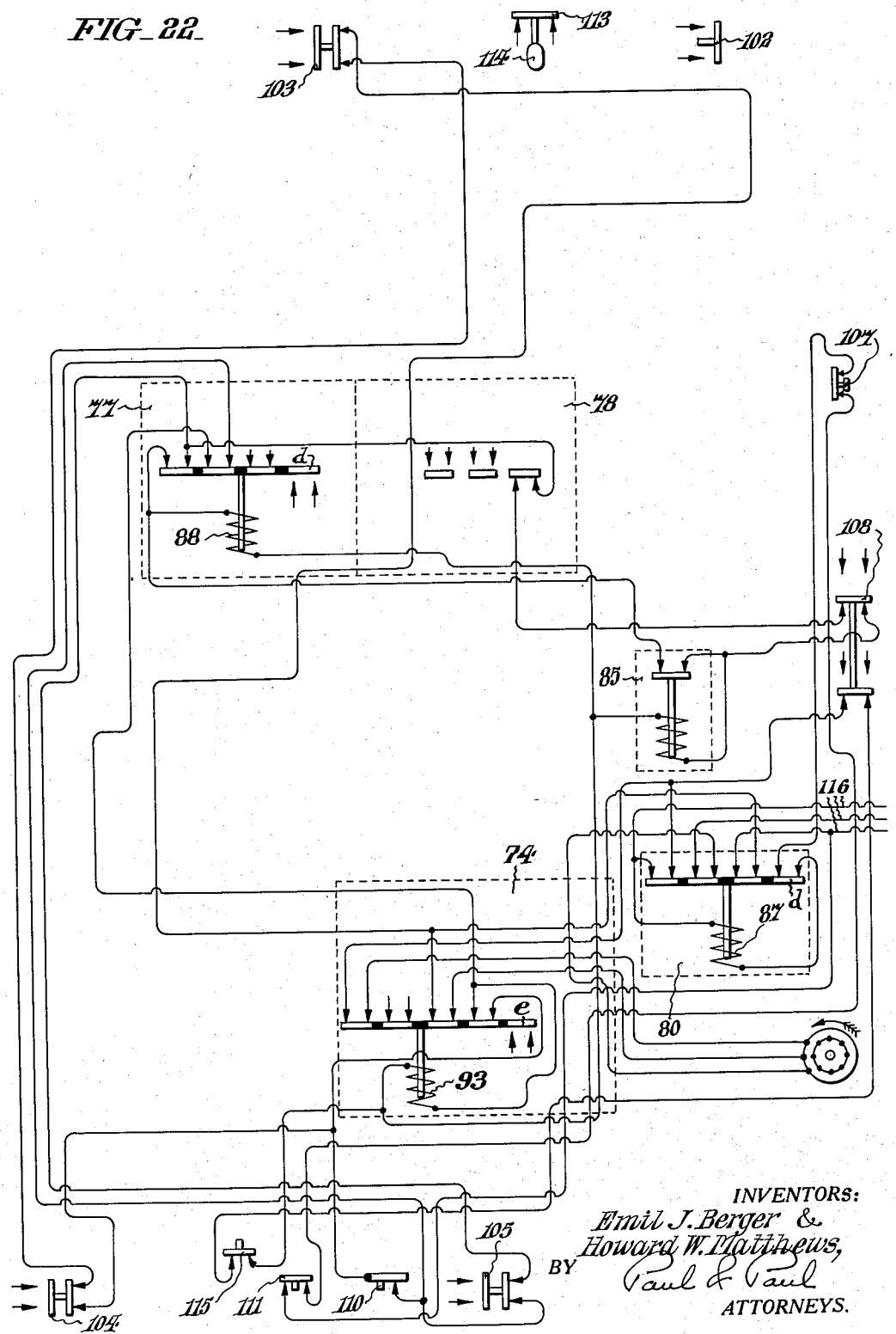

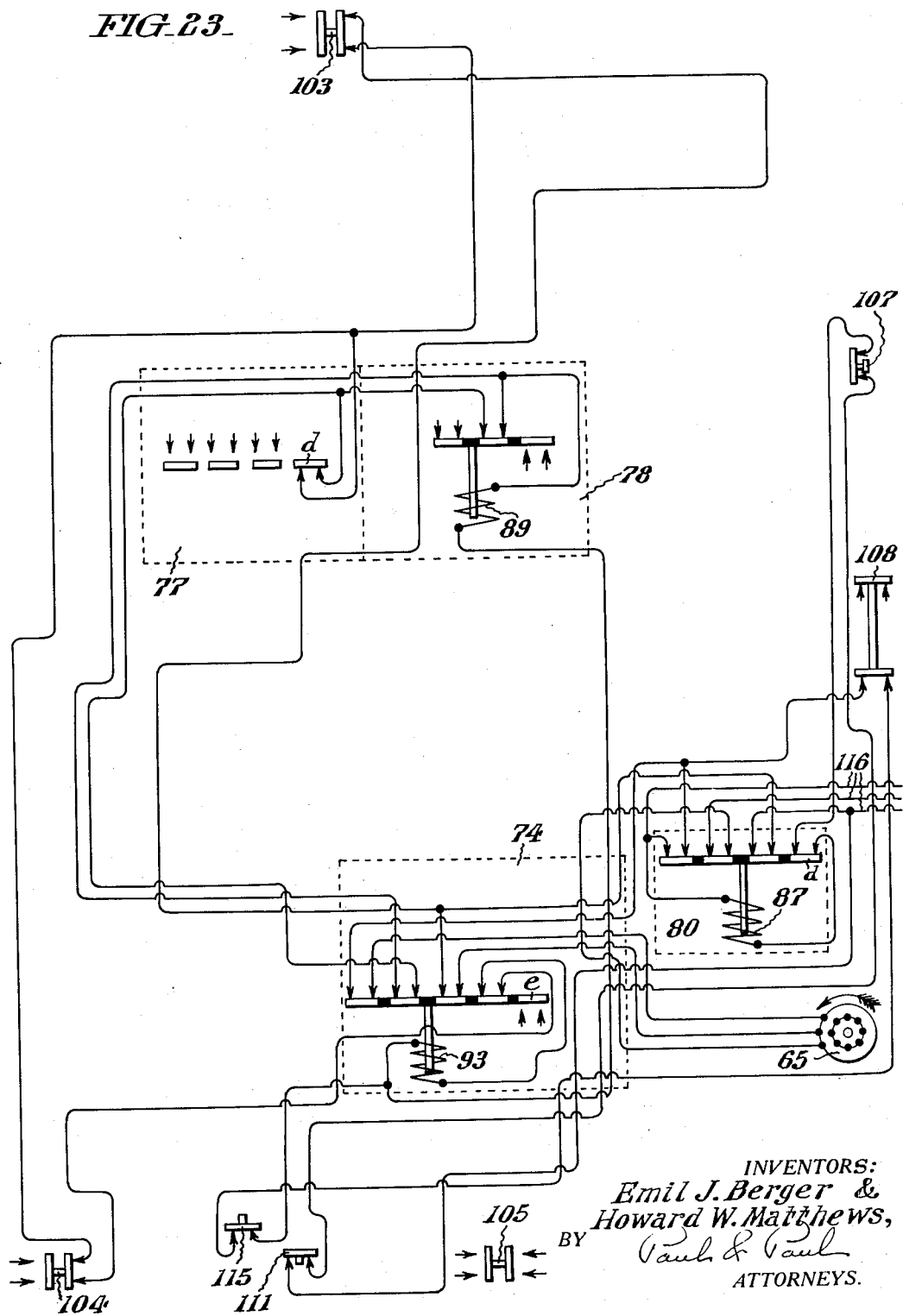

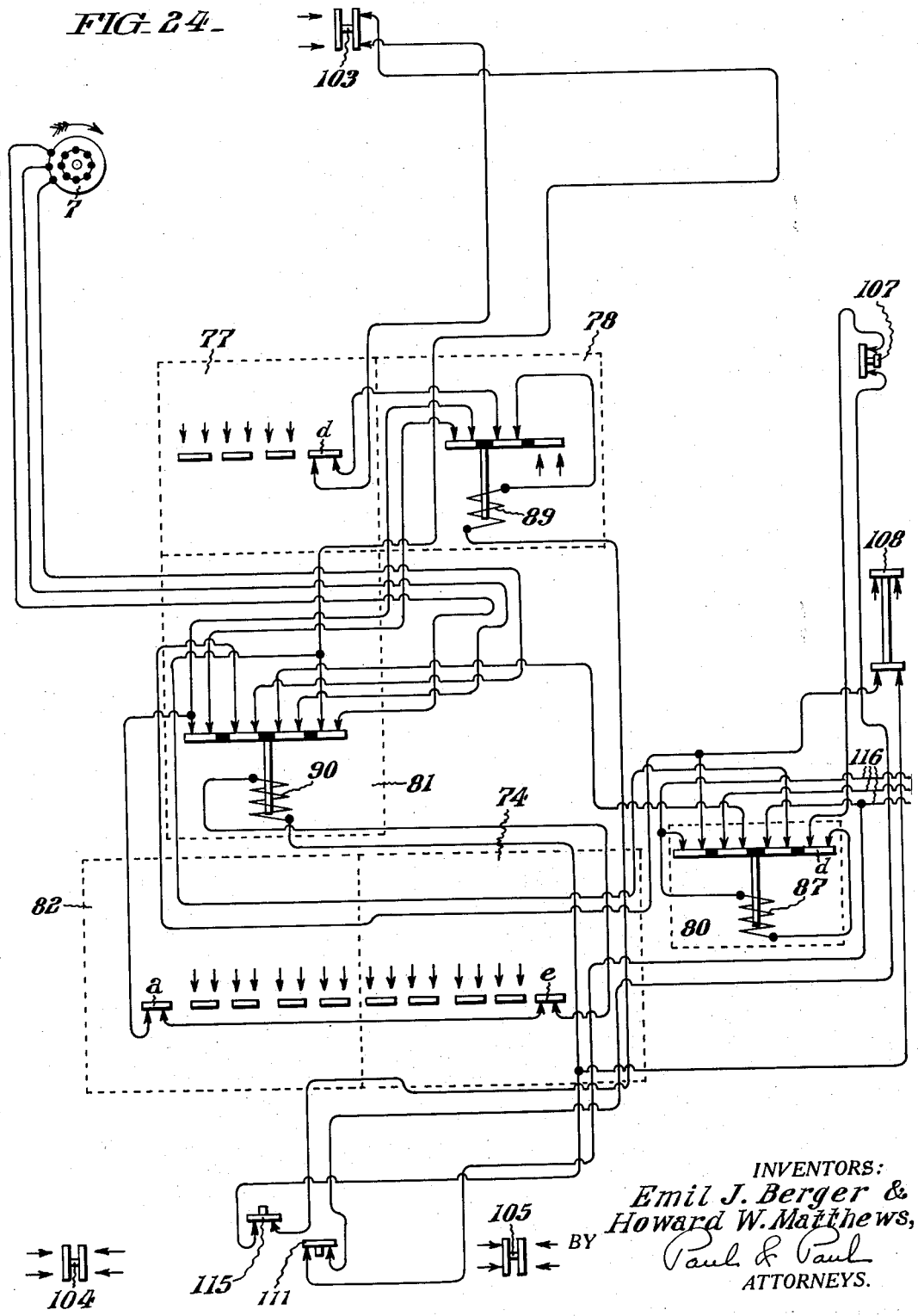

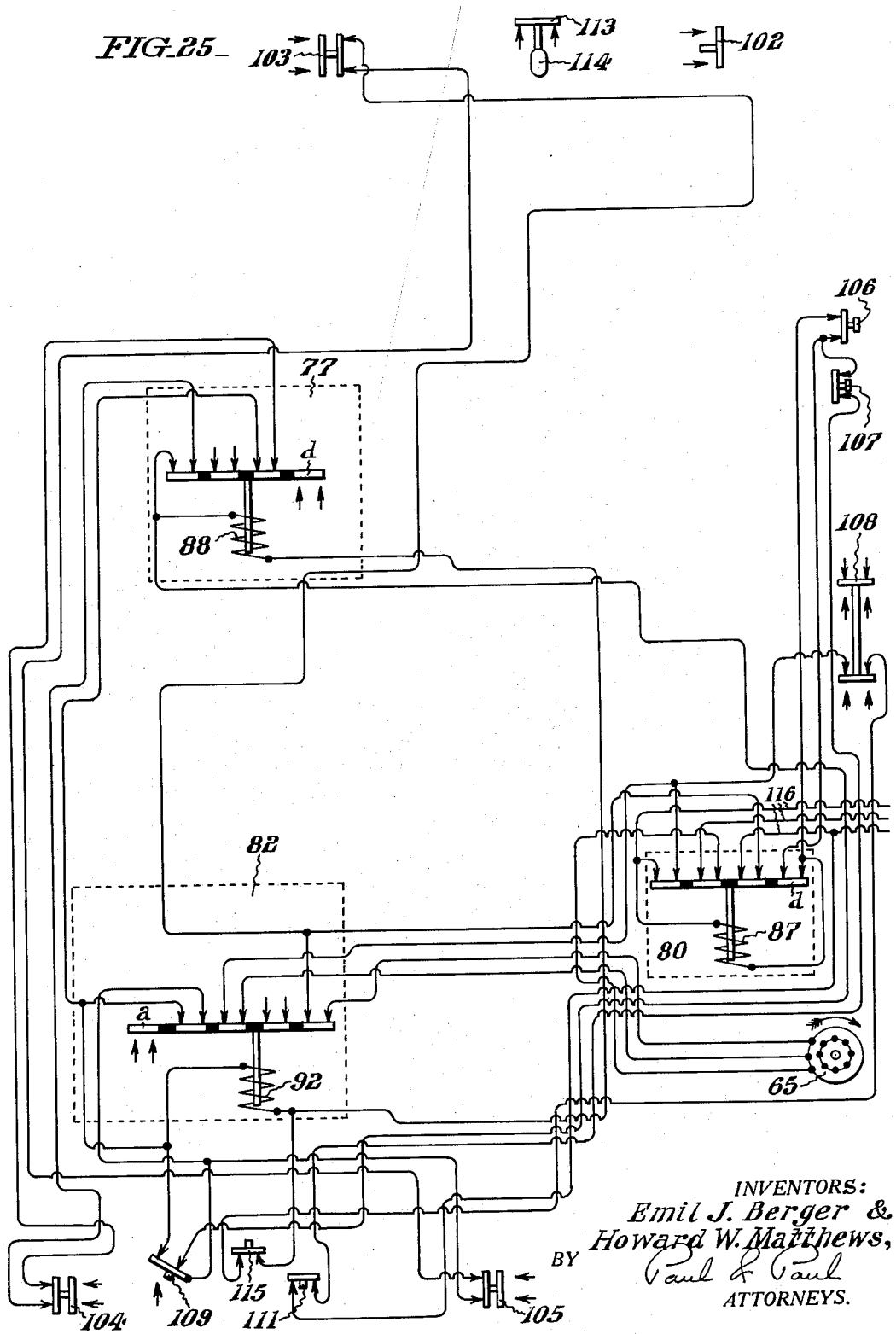

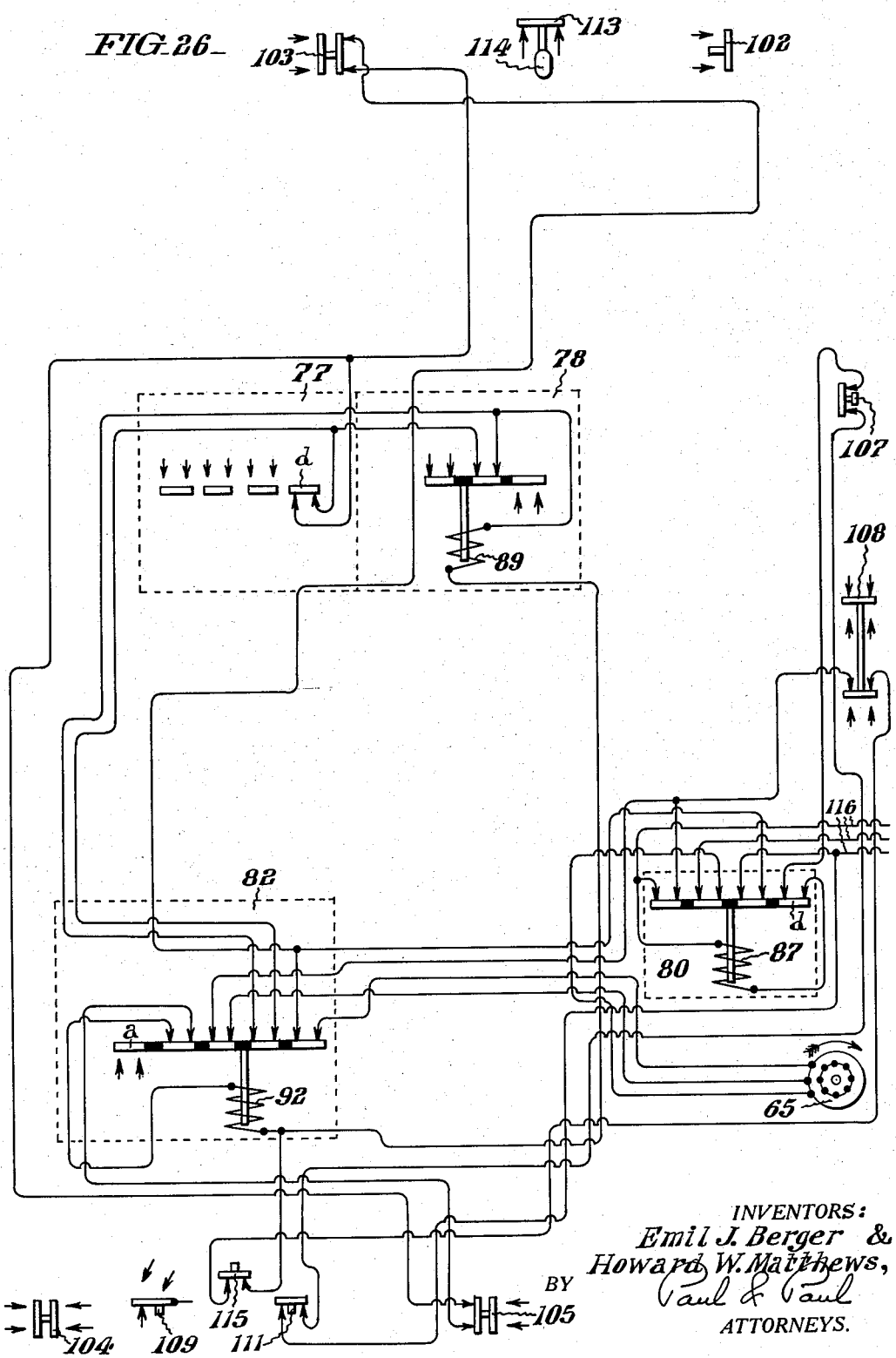

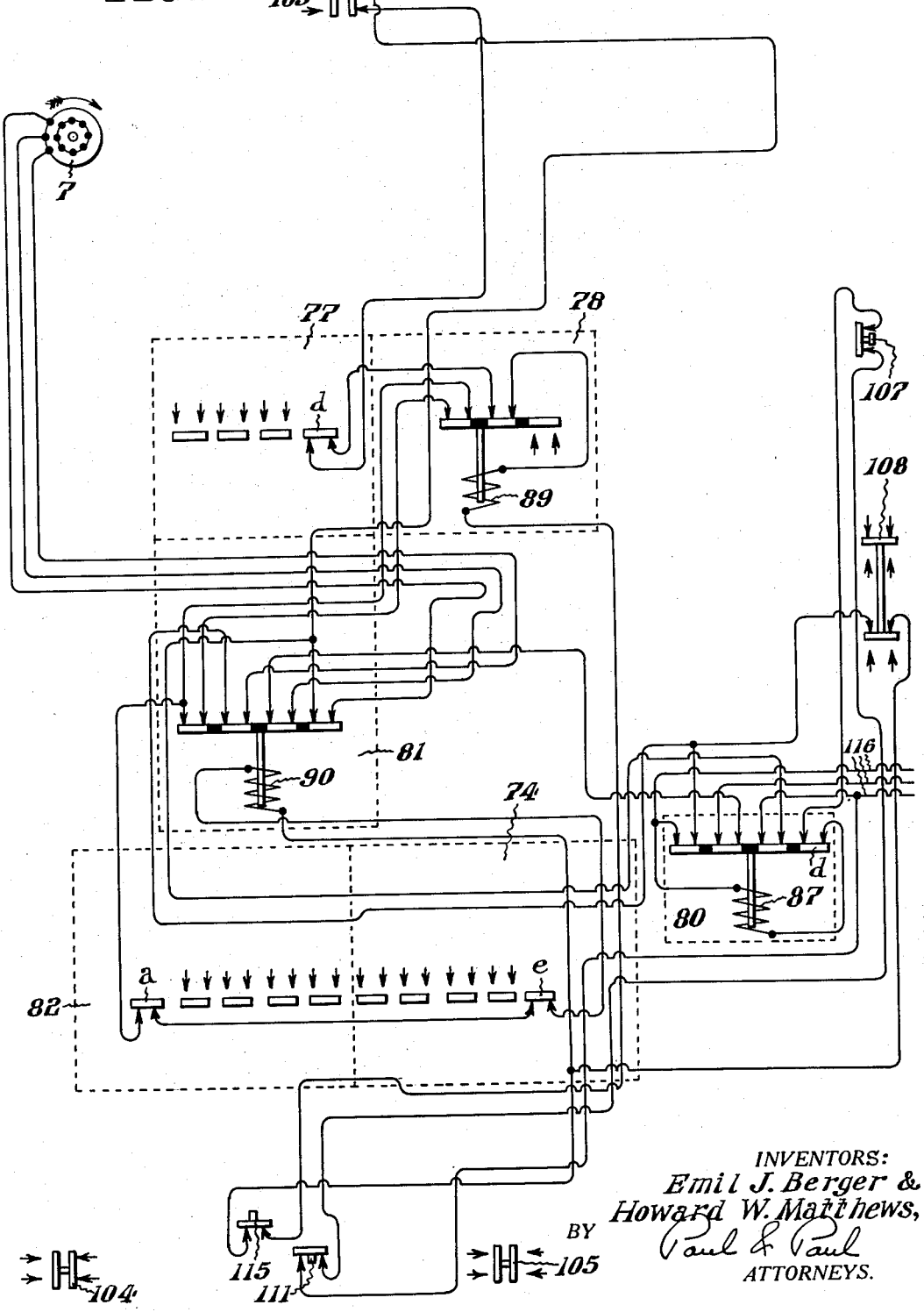

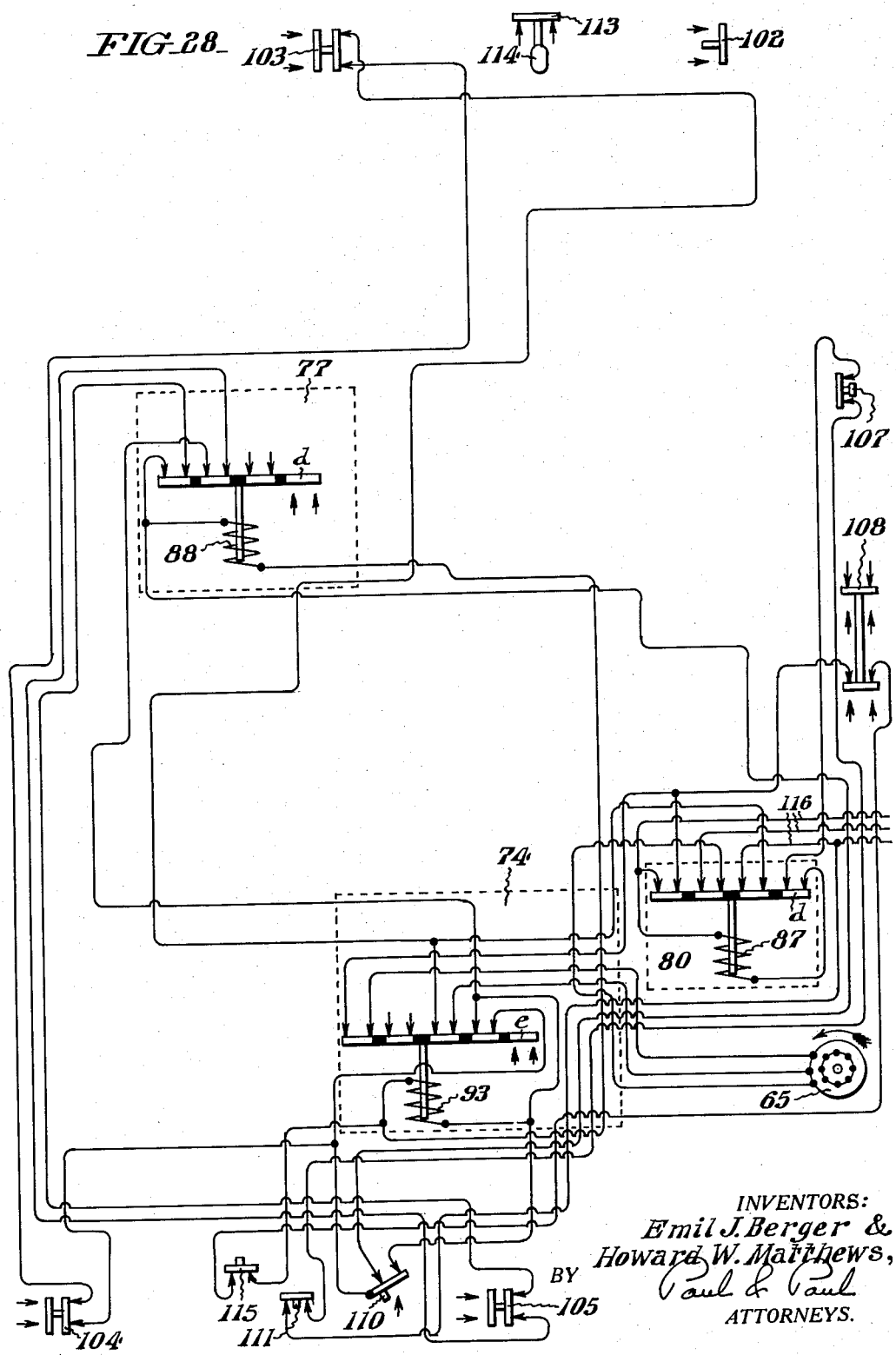

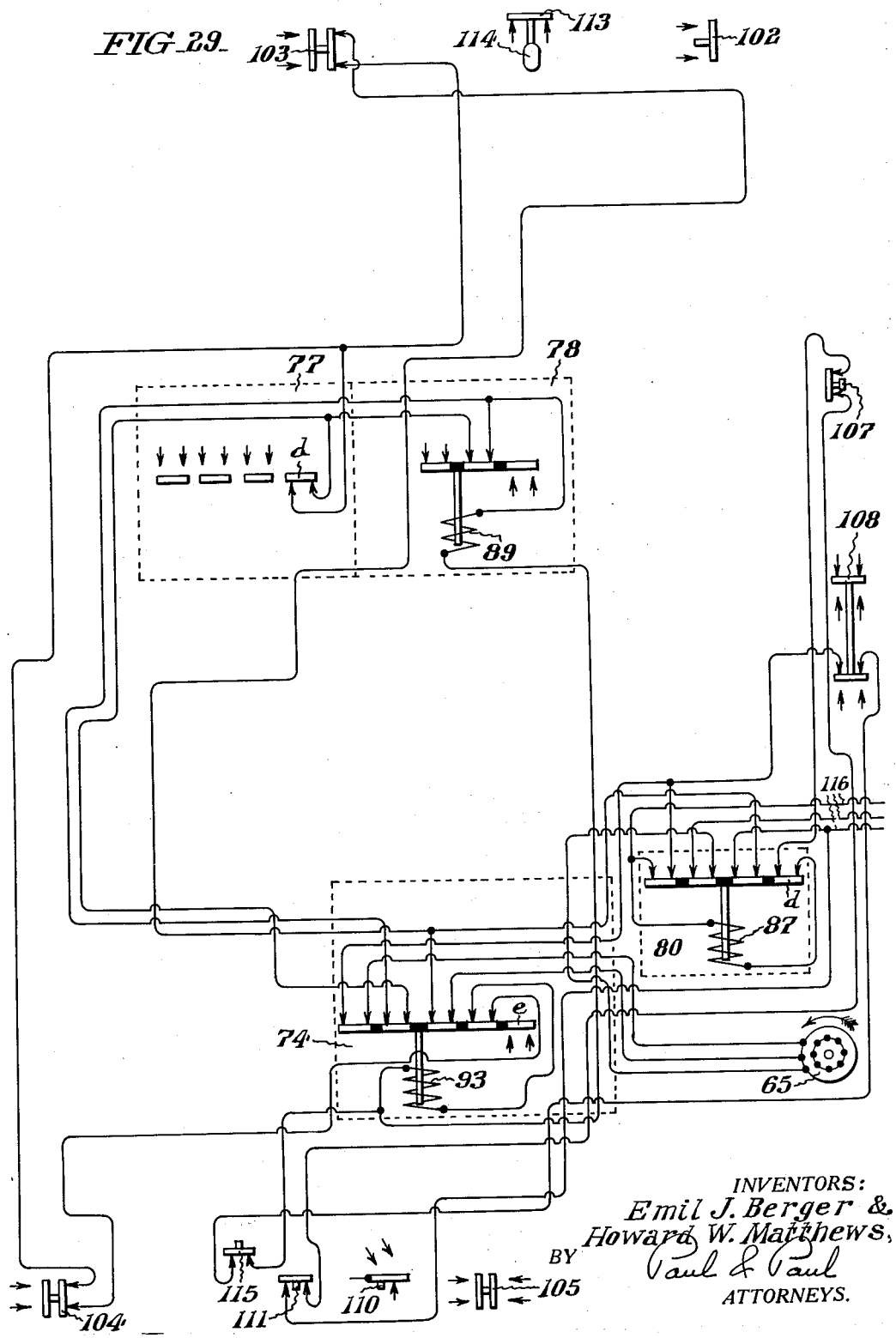

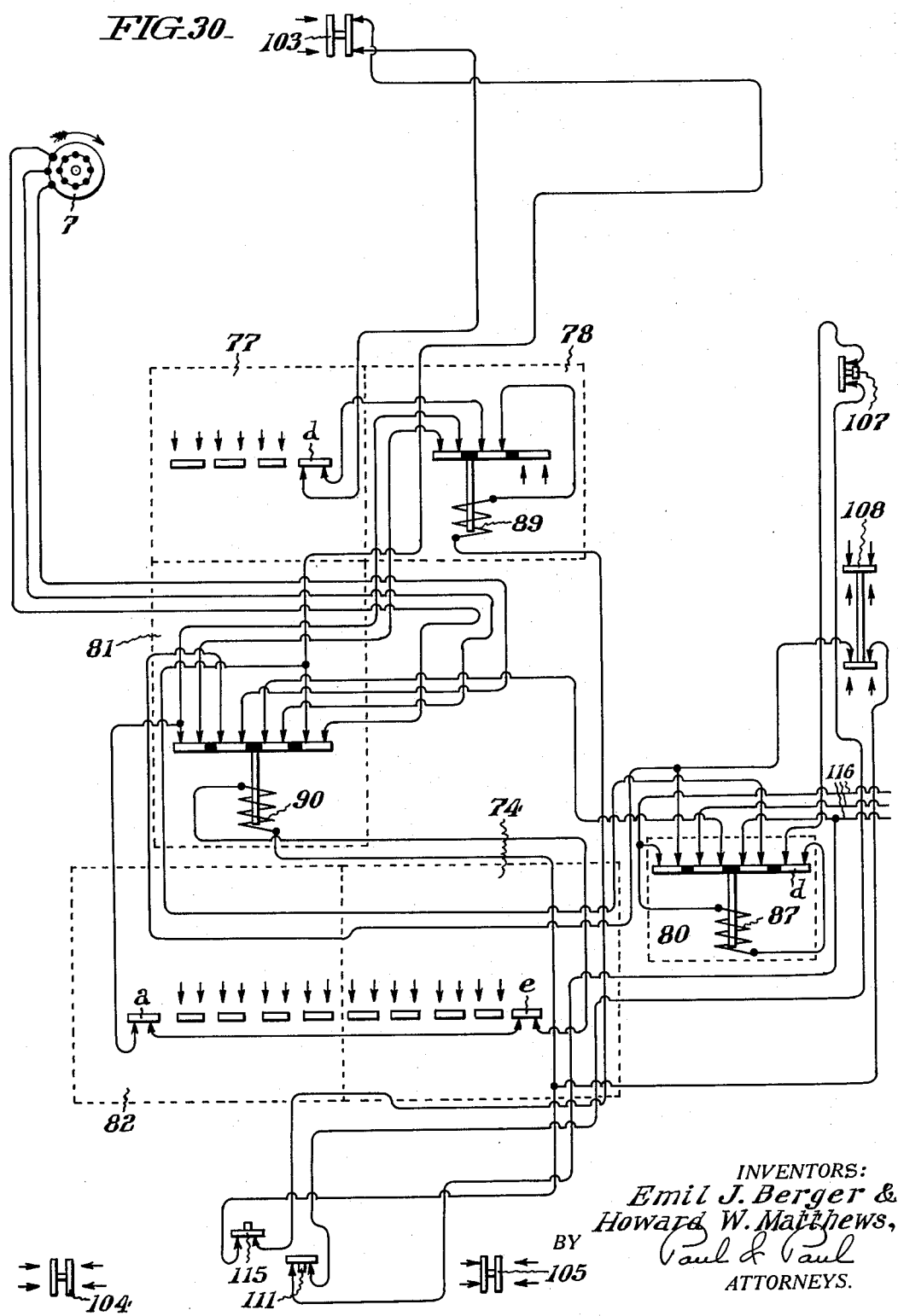

Feb. 28, 1956  E. J. BERGER ET AL  2,736,105
TEXTILE TREATING APPARATUS
Filed Oct. 30 1951  26 Sheets-Sheet 23

FIG.31

INVENTORS:
Emil J. Berger &
Howard W. Matthews,
BY Paul & Paul
ATTORNEYS.

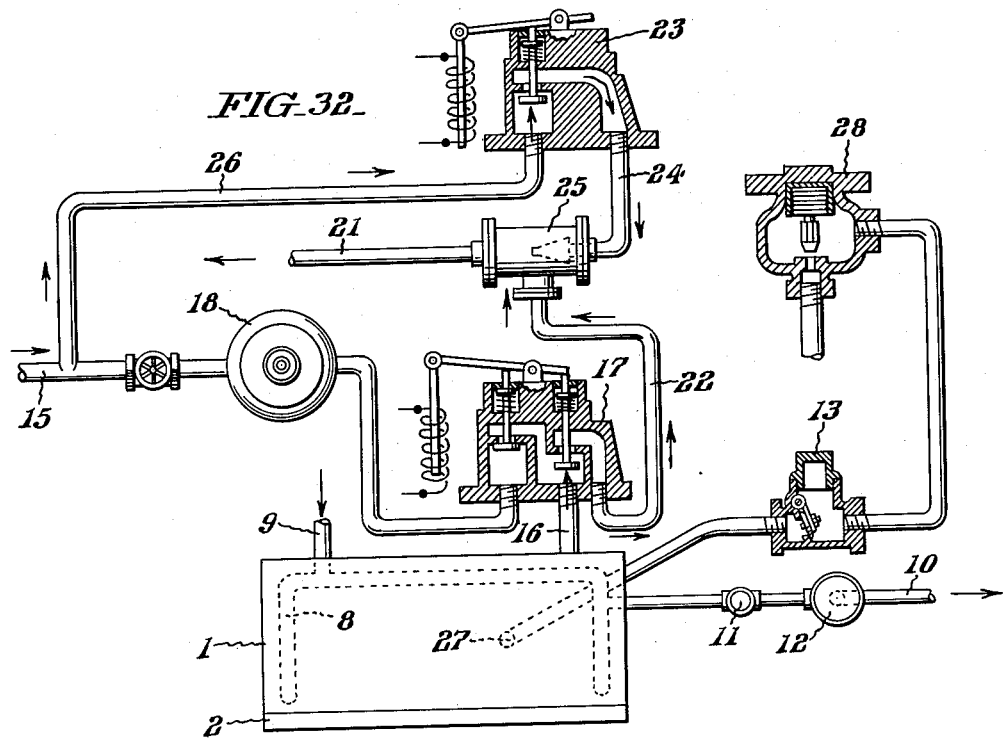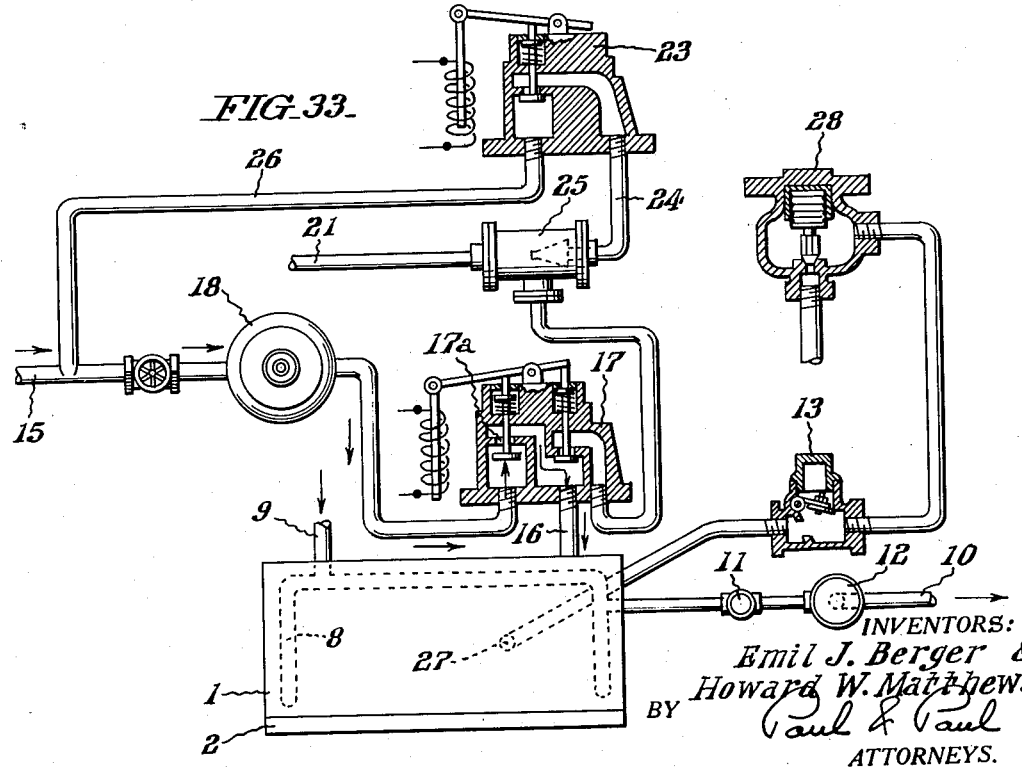

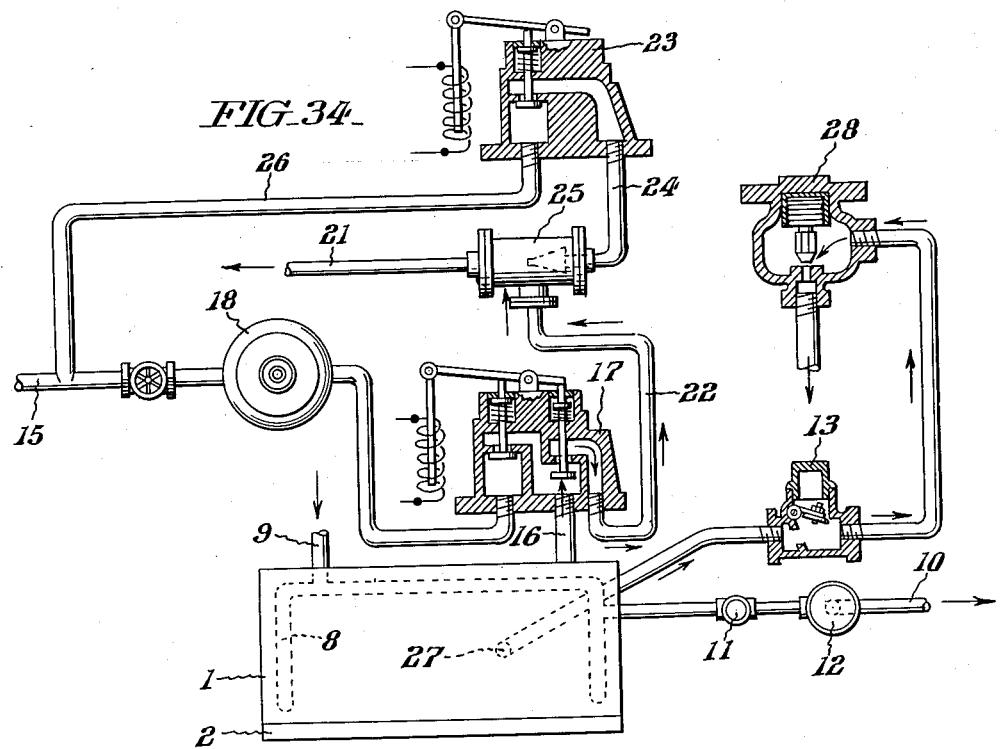
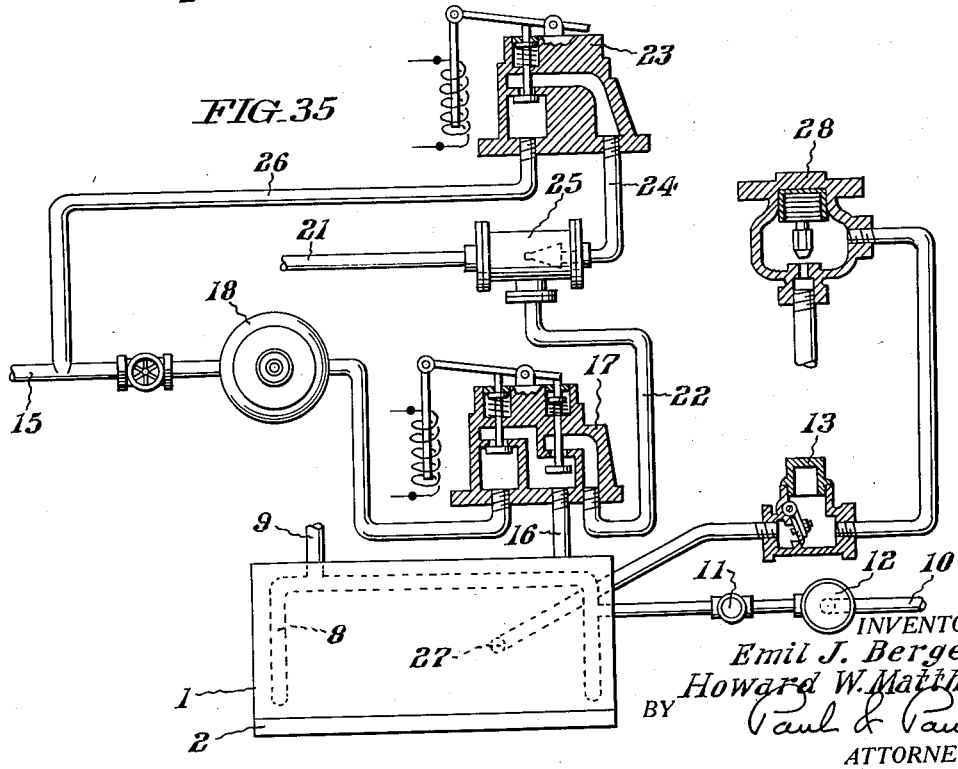

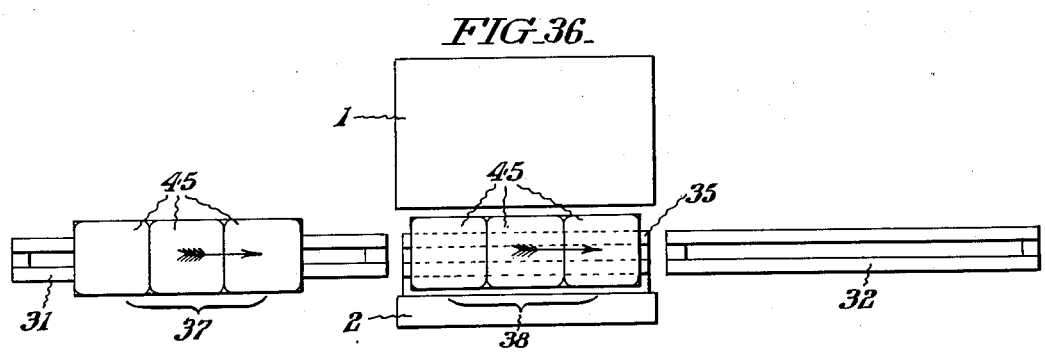
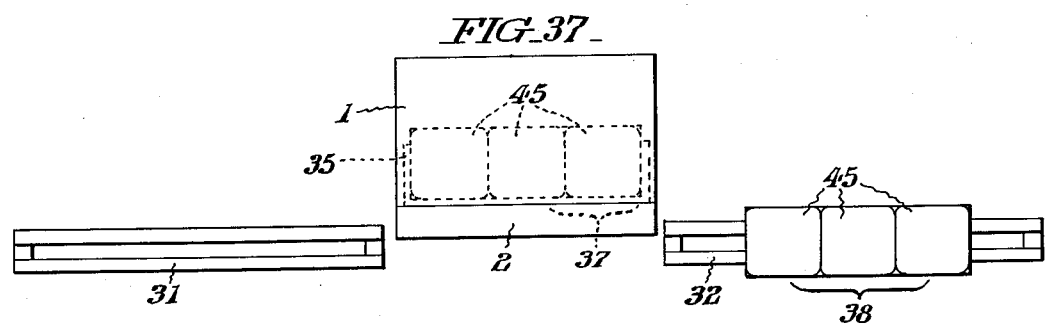
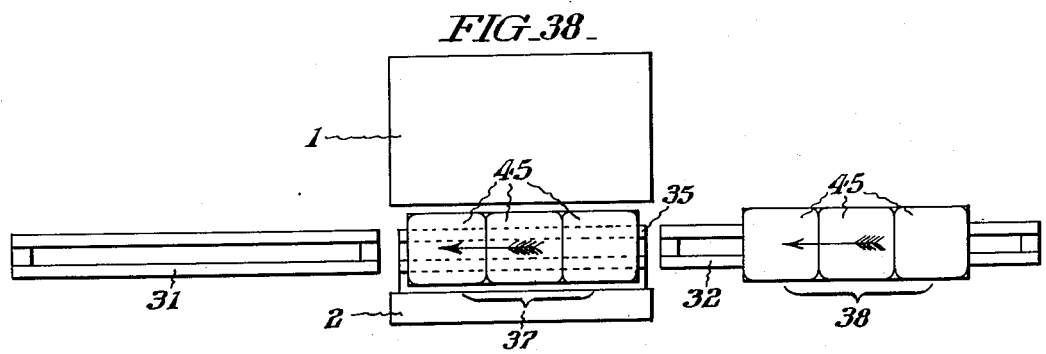
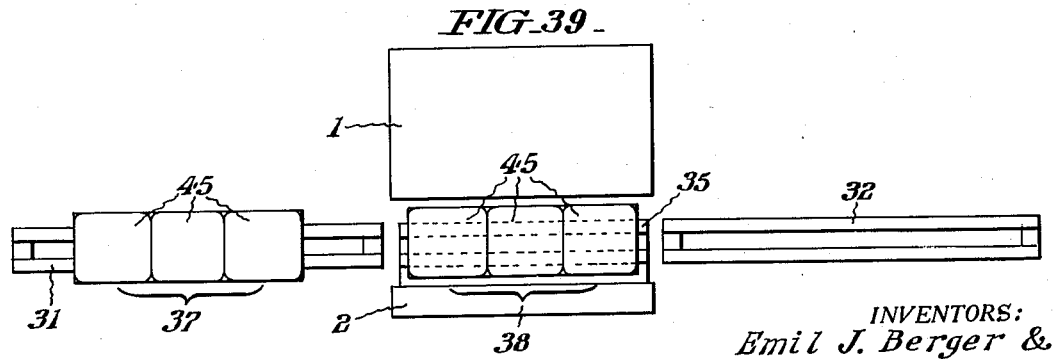

United States Patent Office 2,736,105
Patented Feb. 28, 1956

2,736,105

TEXTILE TREATING APPARATUS

Emil J. Berger, Lansdale, and Howard W. Matthews, Souderton, Pa., assignors to Dexdale Hosiery Mills, Lansdale, Pa., a corporation of Pennsylvania Application October 30, 1951, Serial No. 253,936

9 Claims. (Cl. 34—45)

This invention relates to textile treating apparatus.

More specifically, it has reference to apparatus generally of the types disclosed in U. S. Patents 2,243,997 and 2,321,452 granted to us respectively on June 3, 1941 and on June 8, 1943. The patented apparatus was designed primarily for treatment of manufactured products such as stockings of nylon while stretched on shaping forms, to set the fabric loops by subjection to saturated steam or other hot gaseous treating medium under pressure.

The chief aims of our invention are to provide an improved apparatus of the kind referred to, suitable for the treatment of loose textile materials in bulk such, for example, as pre-crimped nylon staple or tow, to permanently set the crimps; and to provide a simple improved method capable of being efficiently practiced in the apparatus, whereby thorough penetration of the material by the treating medium is assured and a uniformly-treated product is obtained.

In connection with apparatus having the above attributes, it is a further aim of our invention to provide an improved cycle control which can be set for full automatic and continuous operation of the apparatus with successive repetitions of the treating cycle, or set for intermittent or semi-automatic operation with stoppage of the apparatus at the completion of each treating cycle.

How the foregoing and other objects and attendant advantages are realized in practice, will appear from the following detailed description of the attached drawings wherein:

Fig. 1 shows the front elevation of our improved textile treating apparatus.

Fig. 2 shows the apparatus in top plan.

Fig. 3 is a fragmentary view in longitudinal section on a larger scale, taken as indicated by the angled arrows III—III in Fig. 2.

Fig. 4 is a fragmentary view in transverse section, taken as indicated by the angled arrows IV—IV in Fig. 3.

Figs. 5, 6, 7 and 8 are fragmentary views corresponding to Fig. 3 showing different successive positions of a conveying mechanism embodied in the apparatus.

Fig. 9 is a fragmentary broken out view in horizontal section taken as indicated by the angled arrows IX—IX in Fig. 1.

Figs. 10 and 11 are transverse detail sections taken as indicated respectively by the angled arrows X—X and XI—XI in Fig. 1.

Fig. 12 is a perspective view of one of the carriages embodied in the apparatus for supporting containers in which the textile material is placed for treatment in the apparatus.

Fig. 13 is a perspective view of one form of container suitable for use in the apparatus.

Fig. 14 is a wiring diagram of the electrical instrumentalities embodied in the cyclic control means of the apparatus.

Figs. 15–30 are diagrams like Fig. 14 showing how the control means functions under different conditions of operation.

Fig. 31 is a pressure and temperature graph of the operating cycle of the apparatus.

Figs. 32–36 are diagrammatic views showing successive positions assumed during the cycle by valves which govern the flow and exhaust of the pressure fluid; and Figs. 36–39 are diagrammatic views in top plan showing successive positions to which the carriages are shifted during a cycle.

The apparatus of our present invention is generally similar to those of patents hereinbefore referred to in that it comprises a treating chamber 1 having a door 2 which is suspended from trollies 3 confined to travel on fixed overhead guide bars 4 so as to open outwardly in parallel relation to the front of said chamber. Door 2 is operated through a gear rack and pinion means 5 and a speed reducer 6, by a reversible electric motor 7 mounted on the top of chamber 1. Also, as in the aforesaid patents, chamber 1 is internally heated by a radiator 8 into which steam is introduced at one end through a pipe connection 9, and from which it passes off through a pipe connection 10. In the present instance, the coils of radiator 8 are finned and extend across the back and along the sides of the chamber, and the outlet pipe 10 is provided with a check valve 11 and also a trap 12. Other corresponding facilities include a pipe line 15 through which, and a connecting pipe 16, steam is directly introduced into chamber 1 at one side thereof near the bottom, see Fig. 4, under control of a solenoid-actuated valve means generally designated 17, the pressure of the steam being regulatable by means of an adjustable reducing valve indicated at 18 in Fig. 2. As the steam enters chamber 1, it is diffused by a baffle plate 19 (Fig. 4) which is supported upon studs 20 upstanding from the bottom of said chamber at a level somewhat above the end of pipe 16. Leading from solenoid-actuated valve 17 to an exhaust main 21 is a branch pipe 22 in which, in accordance with the present invention, is interposed an ejector 25. A second solenoid-actuated valve 23, is interposed in a branch pipe 24 between ejector 25 and steam line 26. As shown in Fig. 2, pipe 26 connects with main 15 ahead of reducing valve 18, so that steam at full pressure is available for use in the ejector 25 through valve 23 to evacuate the chamber 1 in a manner later described. Drainage of water condensation takes place from the bottom of chamber 1 by way of a pipe 27 in which a normally open trap 28 with a thermally-responsive actuating bellows, and a check valve 13 are interposed.

Further, as in our prior Patent 2,321,452, a guideway is arranged longitudinally of the front of chamber 1, the same comprising fixed track sections 31 and 32 with laterally-spaced rails 31' and 32' which extend to equal distances beyond opposite ends of said chamber. A movable track section 35 with laterally-spaced rails 35' affixed by brackets 36 to the inner side of door 2 at the bottom, aligns with the stationary track sections 31, 32 when said door is in full open position as shown in Figs. 2 and 4.

Associated with the stationary track sections 31 and 32 are tray-like carriages 37 and 38 one of which is separately illustrated in Fig. 12. As shown, each carriage 36 or 37 has the form of a rectangular plate 39 with upstanding angle strips 40 and 41 along its opposite side and end edges, and with transverse separator strips 42 at spaced intervals which, together, provide a seating arrangement for the retainment in serial relation, in the present instance, of three canisters 45, into which the textile materials to be treated are loosely placed. Each such canister 45 has a removal cap cover 46, and its side walls are louvered as indicated at 47. Secured to the carriages 37 and 38 at the bottoms adjacent the relatively remote ends thereof, are socket elements 50 and 51 respectively. These socket elements 50 and 51 are adapted to be engaged by upstanding projections 52 and 53 at the distal ends of arms 55 and 56 which are swingable about axis pins 57 and 58 at opposite ends of a conveyer element in the form of a horizontally-arranged rack bar 59 like that of the aforementioned Patent 2,321,452. As shown, rack bar 59 is sustained for longitudinal traverse between the laterally-spaced rails 60 and 61 of the fixed guideway at a level below the rails 31', 32' by action thereupon of an intermeshing spur wheel 62 on the shaft 63 of a speed reducer 64 (Fig. 4) mounted, with a reversible driving motor 65, in the open base frame 66 whereon chamber 1 is supported. Extending laterally from the distal ends of the arms 55 and 56 are roller projections 67 and 68 which normally ride on auxiliary stationary rails 69 and 70, with the upward projections on said arms engaged in the socket members 50 and 51 on the carriages 37 and 38 as instanced at the left of Fig. 1. Beneath chamber 1, the near ends of the rails 69 and 70 dip downward as at 69' and 70', to allow the arms to drop and thereby release the carriages after carriage 38, for example, has been moved from stationary track section 32 to the track section on door 2, and carriage 37 has, at the same time, been moved from the door to the stationary track section 31 as in Figs. 1 and 2. The inclined guards shown at 71 and 72 insure depression of the arms 55 and 56 in the event that they should have a tendency to stick. As instanced in Fig. 10, each socket element 50, 51 has a diametrically-reduced upward shank projection with a portion that fits the interval between the track rails 31' or 32', and a smaller threaded portion which is passed upwardly through an aperture in the carriage 37, for application of a securing nut 73. Similarly secured to the bottoms of the carriages at the ends opposite those occupied by the elements 50 and 51 are elements 75 and 76 which are identical except for being devoid of socket portions. Thus, by the elements 50, 51 and 75, 76, the carriages 37 and 38 are constrained to travel along the track rails 31' and 32' and are at the same time held against rising therefrom.

As an alternative, instead of removable containers of the type above described, we may employ open sided non-removable containers with shelves, such as the one designated 45a in Fig. 13, whereof the walls are permanently secured to a bottom plate 39a similar to the one illustrated in Fig. 12.

As diagrammatically shown in Fig. 14, the controls which we have devised for governing operation of the apparatus includes a line starter 80, door motor control relays 79 and 81, a conveyor motor 65, control relays 74 and 82, a timer 83, and relays 77, 78, 84 and 85, the latter being a time delay relay. Actually all of these devices are enclosed in a box 86 mounted exteriorly of one end wall of the chamber 1 as shown in Fig. 1. The line starter 80 is of a standard multiple contact type with an actuating solenoid 87. The door motor control relays 79 and 81 are operable by solenoid coils 90 and 91, and conveyor motor control relays 74 and 82, by solenoid coils 92 and 93. Timer 83 is likewise of a standard commercial type in which a motor 94 is arranged to drive a rotor (not illustrated) with plates for bridging a number of contacts 95, 96, 97, 98, 99 and 100 in succession, and in which a solenoid 101 operates a switch for the contacts. The limit switches indicated at 102 and 103 in Fig. 14 are mounted respectively, as shown in Fig. 2, on the distal end of one of the rods 4 and on the top of the chamber 1 so as to be actuated respectively as the door 2 reaches its full open and full closed positions, the switch 103 being of the reversing type. The reversing limit switches indicated at 104 and 105 in Fig. 14 are mounted, as shown in Figs. 1 and 2, adjacent the distal ends of the stationary track sections 31, 32 and are arranged to be actuated by the conveyer element 59. The control further includes start, stop and selector push button switches 106, 107 and 108 which are mounted on the forwardly facing wall of cabinet 86 as shown in Fig. 1, and also auxiliary left and right start push button switches 109, 110 and a stop button switch 111. The latter group of switches is mounted on a fixed bar 112 at the front of the apparatus as shown in Figs. 1 and 2. In addition to the above appurtenances, we have provided another safety switch 113 which is adapted to be influenced by a thermostat 114, the latter being located within the top of chamber 1 as shown in Figs. 1 and 2. Switch 113 is normally closed, but opens upon rise of the temperature in the chamber 1 beyond a prescribed degree. Furthermore, there is a safety switch 115 which is arranged to be actuated by chamber door 2 as will be presently explained. Current for operation of the system is supplied from power means indicated at 116.

Full automatic operation

Let it be assumed that door 2 of treating chamber 1 is all the way open with the carriage 38 on track section 35 at the back of the door, and with carriage 37 positioned at the distal end of stationary track section 31 as shown in Figs. 1 and 36, supporting canisters 45 which have been filled with loose untreated textile material. To prepare the apparatus for full automatic operation, i. e., for carrying out treating cycles, one after another without interruption, selector switch 108 is set in the position in which it is shown in Fig. 14. With this preparation, the attendant in charge of the apparatus presses start button 106 on control panel 86, with consequent energization of coil 87 of line starter relay 80 which immediately closes as in Fig. 15. Upon release of push button 106, the circuit just referred to is maintained by the now bridged contacts d of relay 80. Closing of relay 85 is attended by establishment of a circuit through coil 88 of relay 77 which, in closing, establishes a circuit through coil 92 of relay 82 whereupon the latter closes, in turn, to establish a circuit to the conveyor motor 65, as shown in Fig. 16. Motor 65 is thereby driven in the proper direction to move conveyer element 59 (Fig. 1) to the right as indicated by the arrows in Fig. 36. As conveyer element 59 begins to move, limit switch 104 opens as in Fig. 17, breaking the circuit through coil 88 of relay 77 and also the circuit through coil of time delay relay 85, so that the two latter relays open. Due to bridging of contacts d of relay 77 incident to opening of the latter as just explained, a circuit is established through coil 89 of relay 78 which thereupon closes. By continued movement of conveyer element 59, freshly loaded carriage 37 (Fig. 36) is advanced from stationary track section 31 to door 2 of chamber 1, and carriage 38 from the door to stationary track section 32. Upon reaching the limit of its rightward travel, conveyer element 59 actuates switch 105 as in Fig. 18, with the result that the circuit to solenoid 92 of relay 82 is broken for interruption of current flow to conveyer motor 65 which then stops. Due to bridging of its contacts a as relay 82 opens, a circuit is established to coil 90 of relay 81 whereby the latter is closed, to establish in turn, a circuit to door motor 7, which then operates in the proper direction to close door 2. As door 2 begins its closing movement, safety switch 115 opens and limit switch 102 closes. Eventually, as door 2 reaches fully closed position as shown in Fig. 37, limit switch 103 is shifted to the position of Fig. 19, with attendant breaking of the circuits to the coils of relays 78 and 81 and stopping of door motor 7, and with simultaneous closing of circuits to motor 94 and clutch actuating coil 101 of timer 83. As timer 83 starts its operative phase, its contacts 95 are the first to be bridged, and a circuit is thereby established to the actuating solenoid of valve 23 which is accordingly moved to the position shown in Fig. 32 to allow flow of steam from the main 15 to the nozzle of the ejector 25.

By the action of ejector 25, treating chamber 1 is evacuated by way of pipe 16 and through the open passage of valve 17 and pipe 22, to exhaust main 21. From the graph of Fig. 31, it will be noted that this evacuation period is limited to two minutes. At the expiration of this period, contacts 95 of timer 83 are opened and its contacts 96 incidentally bridged as shown in Fig. 20, with the result that current flow to the actuating solenoid of valve 23 is interrupted and said valve resumes the normal position of Fig. 14, and that a circuit to the solenoid of valve 17 is established to position the latter valve as shown in Fig. 33. As a consequence steam under pressure is admitted into chamber 1 now from supply main 15, by way of open port 17a of valve 17 and through pipe 16. As the temperature in chamber 1 rises, safety switch 113 opens to insure against the possibility of door 2 being opened accidentally during the steaming. As indicated in the graph of Fig. 31, the steam pressure is held for a period of three minutes whereupon contacts 96 of timer 83 opens, with attendant breaking of the circuit to actuating solenoid of valve 17 which then re-assumes the normal position of Fig. 34, shutting off the steam and allowing chamber 1 to exhaust by way of pipes 16 and 22 into exhaust main 21 for a period of a half minute as indicated in Fig. 31. At the expiration of this exhaust period, contacts 97 of timer 83 are bridged with consequent setting up again of the conditions shown in Figs. 19 and 32 for a two minute period according to the graph of Fig. 31 for another evacuation of chamber 1. Thereupon contacts 97 of timer 83 are opened and contacts 98 are bridged to again bring about the condition shown in Figs. 20 and 33 for the admission of steam again into chamber 1, this time for a longer period to wit, ten minutes according to the graph of Fig. 31. At the expiration of this second steaming period, contacts 98 of timer 83 are opened, with consequent bringing about again of the conditions described in connection with Fig. 34 to allow exhaust of chamber 1 for a period of a half minute. At the termination of this exhaust period, contacts 99 of timer 83 are closed to again bring about the conditions described in connection with Figs. 19 and 32 for a third two minute evacuation of chamber 1 as indicated on the graph of Fig. 31, whereupon contacts 99 are opened to permit valve 23 to resume the normal position of Fig. 35 and to allow venting of said chamber for a period of ten seconds or so as also indicated on the graph. Upon elapse of this venting period contacts 100 of timer 83 are bridged, as in Fig. 21, to establish a circuit to coil 91 of relay 79 which thus closes and, in turn, establishes a circuit for reverse operation of motor 7 to open door 2. At the initiation of this opening movement of door 2, switch 103 is actuated to break the circuits to the motor 94 of timer 83 which latter then stops after a complete rotation of its rotor. As door 2 reaches full open position, Fig. 38, it actuates limit switch 102 as shown in Fig. 22, whereby the circuit to door motor 7 is interrupted. An operative cycle of the machine is thus completed. By evacuation of the treating chamber 1 as above explained, the bulky material under treatment in the containers 45 is opened up for increased surface exposure to the action of the steam afterwards admitted into said chamber. This not only results in thorough penetration of the material by the steam, but makes possible the carrying out of the treatment in a minimum of time.

Closing of the stop switch 115, upon opening of the door as just explained, is attended by re-establishment of the circuit to the coil of time delay relay 85 but relay 85 being a time delay relay it does not close immediately. After expiration of the time period (about three minutes) for which relay 85 is adjusted, the latter closes as in Fig. 22, and in turn establishes a circuit to the coil 88 of relay 77 for the initiation of the next cycle. By actuation of relay 77, a circuit to coil 93 of relay 74 is set up, and through closing of the latter, a circuit is established in turn to motor 65 which is thereby operated as in Fig. 22, this time in reverse, for movement of conveyor element 59 to the left as indicated by the arrows in Fig. 38. As conveyor element 59 begins to move, limit switch 105 opens as in Fig. 23 breaking the circuit through coil 88 of relay 77 and also the circuit through coil of time delay relay 85, so that the two latter relays open. Due to bridging of contacts d of relay 77 incident to opening of the latter as just explained, a circuit is established through coil 89 of relay 78 which thereupon closes. By continued movement of conveyor element 59, freshly loaded carriage 38 of Fig. 38 is advanced from stationary track section 32 to door 2 of chamber 1, and carriage 37 from the door to stationary track section 31 as shown in Fig. 39. Upon reaching the limit of its leftward travel, conveyor element 59 actuates switch 104 as in Fig. 24, with the result that the circuit to solenoid 93 of relay 74 is broken for interruption of current flow to conveyor motor 65 which then stops. Due to bridging of its contacts e as relay 74 opens, a circuit is established to coil 90 of relay 81 as shown in Fig. 18 and the operations thereafter continues in the same manner as hereinbefore described in connection with Figs. 19, 20 and 21 under control of timer 83 with eventual opening of door 2 and stopping of motor 7. Another cycle of the machine is thus completed with the carriages 37 and 38 positioned as shown in Fig. 39 and with restoration of the control system to the condition in which it is shown in Fig. 15 in readiness for the starting of another cycle, repeated over and over again in succession and without interruption as long as selector switch 108 is kept in the position of Fig. 14. By subjection of the bulk material in the receptacles 45 while in chamber 1, to suction before each of the several pressure stages during the cycle, thorough penetration by the steam is assured and hence, a uniformly treated product is obtained as a result of such processing. The duration of alternate suction and pressure phases can of course be varied by adjustment of the timer as may be desired or required for different kinds of materials to be treated.

*Semi-automatic operation*

Again, let it be assumed that the carriages 37 and 38 are positioned as in Figs. 1 and 36 i. e., with the former on stationary track section 31 and with the latter on chamber door 2. The apparatus is prepared for the semi-automatic operation by setting selector switch 108 as shown in Fig. 25 to eliminate time delay relay 85, and then pressing push button 106 whereby a circuit to coil 87 of relay 80 is established and the latter closes. With this accomplished, button 109 at the front of the machine is pressed and, as a result, circuits are established to coils 88 and 92 respectively of relays 77 and 82 as also shown in Fig. 25. As a result, current is supplied to conveyor motor 65 which is then driven to simultaneously advance carriages 37 and 38 leftward as indicated by the arrows in Fig. 36. By actuation of switch 104 at the initiation of conveyor travel, the circuit to coil 88 of relay 77 is interrupted and the latter opens with attendant bridging of its contacts d as in Fig. 26. As a consequence, relay 78 is closed through energization of its actuating coil 89 for maintenance of current flow to conveyer motor 65. As conveyor element 59 nears the end of its rightward travel and shifts switch 105 as shown in Fig. 27, the circuit to coil 92 of relay 82 is broken, and as said relay opens, the circuit to conveyor motor 65 is interrupted and said motor stops. Opening of relay 82, as just explained, is attended by bridging of its contacts a and establishment of a circuit to door motor 7, likewise as shown in Fig. 27. From here on, the cycle proceeds in the same manner as hereinbefore described in connection with Figs. 19, 20, and 21.

However since, in this instance, time delay relay 85 has been eliminated by setting of selector switch as in Fig. 25, the cycle will end upon stopping of motor 7 when the circuit to the latter is interrupted by opening of relay 79 as door 2 opens limit switch 102, with the carriages 37 and 38 positioned as in Fig. 38.

For the next semi-automatic cycle of the machine, it is necessary for the machine attendant to press push button 110 as in Fig. 28, with the result that relay 77 is closed, and immediately followed by closing of relay 74 which establishes the circuit to conveyer motor 65. Motor 65 is thereby driven in the proper direction to advance the conveyer element 59 this time from right to left as indicated by the arrows in Fig. 38. At the initiation of this movement of conveyer element 59, switch 105 opens as in Fig. 29, with attendant interruption of the circuit to coil 88 of relay 77 which opens in turn and, through incidental bridging of its contacts d, the circuit to coil 89 of relay 78 is established and the last mentioned relay closed to keep conveyer motor 65 running. As conveyer element 59 completes its leftward travel and actuates switch 104, relay 74 will open with attendant stopping of conveyer motor 65. Through bridging of its contacts e as relay 74 opens, a circuit is established to coil 90 of relay 81, with incidental closing of a circuit to door motor 7 as in Fig. 30. The instant cycle proceeds from then on in the same manner as hereinbefore described in connection with Figs. 19, 20 and 21, except that here again, due to the setting of selector switch 108 and elimination of time delay relay 85, the cycle will end after the completion of the alternate vacuum and pressure treatment under control of timer 83, with stopping of door motor 7 when the door has been moved to full open postion and the carriages 37 and 38 are stationed as in Fig. 39.

When necessary or desired, the machine can be stopped at any point during either full automatic or semi-automatic cycle operation by pushing either of stop buttons 107 or 111.

Having thus described our invention we claim:

1. In a textile treating machine having a treating chamber with a door movable forwardly to open position in parallel relation to the front of the chamber, a guideway with straight horizontal sections longitudinally of the front of the chamber respectively beyond opposite sides of the latter, an auxiliary track section on the door registering with the stationary track sections when the door is open, carriages for the support of the textile material to be treated respectively associated with the stationary track sections, and a conveying element movable along the guideway; means for connecting the carriages to opposite ends of the conveying element so that one carriage is at the remote end of its track section when the other carriage is at the auxiliary track section on the door, said means comprising a toothed rack teeth on the conveying element; a gear wheel in mesh with the rack; a reversible motor for driving the gear wheel; a pair of gravity-influenced arms movable about pivots respectively at opposite ends of the conveying element, said arms respectively having lateral and vertical projections at their distal ends; and cam tracks on the guideways cooperative with the lateral projections of the arms for lifting the arms and thereby causing their vertical projections to engage the respective carriages in preparation for their advancement from the auxiliary track sections on the door to or from the respective stationary track sections.

2. In textile treating apparatus, a treating chamber; separate conduits through which steam is supplied to and exhausted from the chamber; a double acting valve interposed in the steam supply conduit for preventing evacuation of the chamber when steam is admitted thereto and for permitting such evacuation at other times; means for controlling the valve; a by-pass pipe leading from the steam supply pipe at a point in advance of the valve to a nozzle in the exhaust conduit; an auxiliary valve interposed in the by-pass pipe; and control means for opening the auxiliary valve for supply of steam to the nozzle when the double acting valve is set for evacuation of the chamber and for closing said auxiliary valve when the double acting valve is set for admission of steam to the chamber.

3. Textile treating apparatus according to claim 2, wherein the two valves are of the solenoid-actuated type; and wherein the control means comprises an electric system in which the coils of the actuating solenoids of the valves are interposed with a timer for determining an operative cycle during which the chamber is alternately pressurized and evacuated several times in succession for definite predetermined periods.

4. Textile treating apparatus according to claim 2, further including a drain pipe leading from the chamber; a normally-open valve in the drain pipe with thermostatic actuating means for automatically closing it upon admission of steam into the chamber; and a check valve also in the drain pipe closing in response to suction when the chamber is being evacuated.

5. In textile treating apparatus a treating chamber with a door movable forwardly to open position in parallel relation to the front of the chamber; a guideway with stationary sections longitudinally of the front of the chamber and respectively beyond opposite sides of the latter; an auxiliary track section at the back of the door registering with the stationary track sections when the door is open; carriages, for the support of the textile material to be treated, respectively associated with the stationary track sections; a reciprocative conveyer movable along the guideway for moving one carriage from its track section to the auxiliary section on the door and for concurrently moving the other carriage from the auxiliary section on the door to its track section, and vice versa; a reversible electric motor for actuating the conveyer; a conduit with an interposed magnetically actuated valve for admitting steam under pressure into the chamber; an exhaust conduit with a jet nozzle interposed therein; a by-pass conduit leading from the steam conduit and having a magnetically-actuated valve for controlling flow of steam to the nozzle for exhausting the chamber; and an electric control system comprising circuits respectively for the conveyer motor, the door motor and the coils of the magnetically-actuated valves, switch means automatically operated by the conveyer upon completion of its movement in one direction in transferring one carriage to the door and transferring the other carriage from the door to its track section, to close the door motor circuit for closing the door, switch means for breaking the door motor circuit when the door is closed and for closing the circuit of the magnetically-actuated valve for admission of steam into the chamber, timer controlled switch means operative after lapse of a predetermined time interval to interrupt the circuit of the magnetic steam-admitting valve and closing the circuit of the magnetically-actuated jet control for evacuation of the chamber, timer controlled switch means operative after another predetermined time interval to open the circuit of the last mentioned magnetically-actuated valve and to close the door motor circuit for reversal of the door motor and opening of the door, switch means operative to break the door motor circuit after the door is opened and for closing the conveyer motor circuit for reversal of the conveyer motor to move the carriage then at the door to its track section and the other carriage from its track section to the door.

6. Textile treating apparatus according to claim 5, in which the electric control system further includes means for causing the magnetically-actuated valves to be operated several times in alternation to determine repetitive treatment of the material to steam and suction action during the cycle while in the chamber.

7. Textile treating apparatus according to claim 5, in which the electric control system further includes means for causing the magnetically-actuated valves to be operated several times in alternation for periods of different duration to determine repetitive treatment of the material to steam and suction action during the cycle while in the chamber.

8. Textile treating apparatus according to claim 5, wherein the electric control system further includes a manual selector switch for changing the circuit connections to determine continuous repetitions of the cycle recited on the later claim, or for bringing the apparatus to a stop at the completion of each cycle.

9. Textile treating apparatus according to claim 5, wherein the electric control system further includes a thermally-actuated switch for breaking all of the circuits in the event that the temperature in the chamber exceeds a predetermined degree during the steam treating period.

References Cited in the file of this patent

UNITED STATES PATENTS

| Number | Name | Date |
|---|---|---|
| 874,265 | Volney | Dec. 17, 1907 |
| 996,943 | Rodgers | July 4, 1911 |
| 1,209,643 | Price | Dec. 19, 1916 |
| 1,597,401 | Cope | Aug. 24, 1926 |
| 2,127,638 | Brandwood | Aug. 23, 1938 |
| 2,243,997 | Berger et al. | June 3, 1941 |
| 2,256,954 | Smith, Jr. et al. | Sept. 23, 1941 |
| 2,299,040 | Schwartz | Oct. 13, 1942 |
| 2,304,897 | Drum et al. | Dec. 15, 1942 |
| 2,321,452 | Berger et al. | June 8, 1943 |
| 2,344,151 | Kasser | Mar. 14, 1944 |
| 2,350,021 | Dunn | May, 30, 1944 |
| 2,446,502 | Wehrli | Aug. 3, 1948 |
| 2,451,978 | Richter | Oct. 19, 1948 |
| 2,520,062 | Richter | Aug. 22, 1950 |
| 2,572,893 | Richter | Oct. 30, 1951 |